(12) United States Patent
Inagaki

(10) Patent No.: US 8,253,537 B2
(45) Date of Patent: Aug. 28, 2012

(54) APPARATUS FOR COMMUNICATING WITH RFID TAG AND ARTICLE MANAGEMENT SYSTEM

(75) Inventor: Yuta Inagaki, Seto (JP)

(73) Assignee: Brother Kogyo Kabushiki Kaisha, Nagoya-Shi, Aichi (JP)

( * ) Notice: Subject to any disclaimer, the term of this patent is extended or adjusted under 35 U.S.C. 154(b) by 528 days.

(21) Appl. No.: 12/584,929

(22) Filed: Sep. 14, 2009

(65) Prior Publication Data

US 2010/0079259 A1 Apr. 1, 2010

(30) Foreign Application Priority Data

Sep. 26, 2008 (JP) .................................. 2008-248830

(51) Int. Cl.
*H04Q 5/22* (2006.01)
(52) U.S. Cl. ......... 340/5.91; 340/10.1; 235/385; 705/28
(58) Field of Classification Search .................. 340/5.91, 340/10.41, 10.1, 572.1; 235/385; 705/22, 705/28, 29
See application file for complete search history.

(56) References Cited

U.S. PATENT DOCUMENTS 6,078,251 A * 6/2000 Landt et al. ................ 340/10.41
2008/0055088 A1 * 3/2008 Fabre et al. ................ 340/572.1

FOREIGN PATENT DOCUMENTS

JP 2003094858 A 4/2003
JP 2007140677 A 6/2007

* cited by examiner

*Primary Examiner* — Edwin Holloway, III
(74) *Attorney, Agent, or Firm* — McCarter & English, LLP

(57) ABSTRACT

A reader obtains tag identification information of an RFID tag circuit element for article via radio communication using an apparatus antenna, stores the obtained tag identification information in a memory, gets area identification information of each room relating to a plurality of rooms storing the articles and a corresponding number of articles in association with each other from a database, calculates the number of the RFID tag circuit elements for article on the basis of a remaining memory capacity of the memory, the tag identification information capable of newly stored, compares the number of articles obtained as above with the number of RFID tag circuit elements for article calculated as above and determines the room with a corresponding number of articles not more than the number of RFID tag circuit elements for article as an inventory-manageable area.

12 Claims, 19 Drawing Sheets

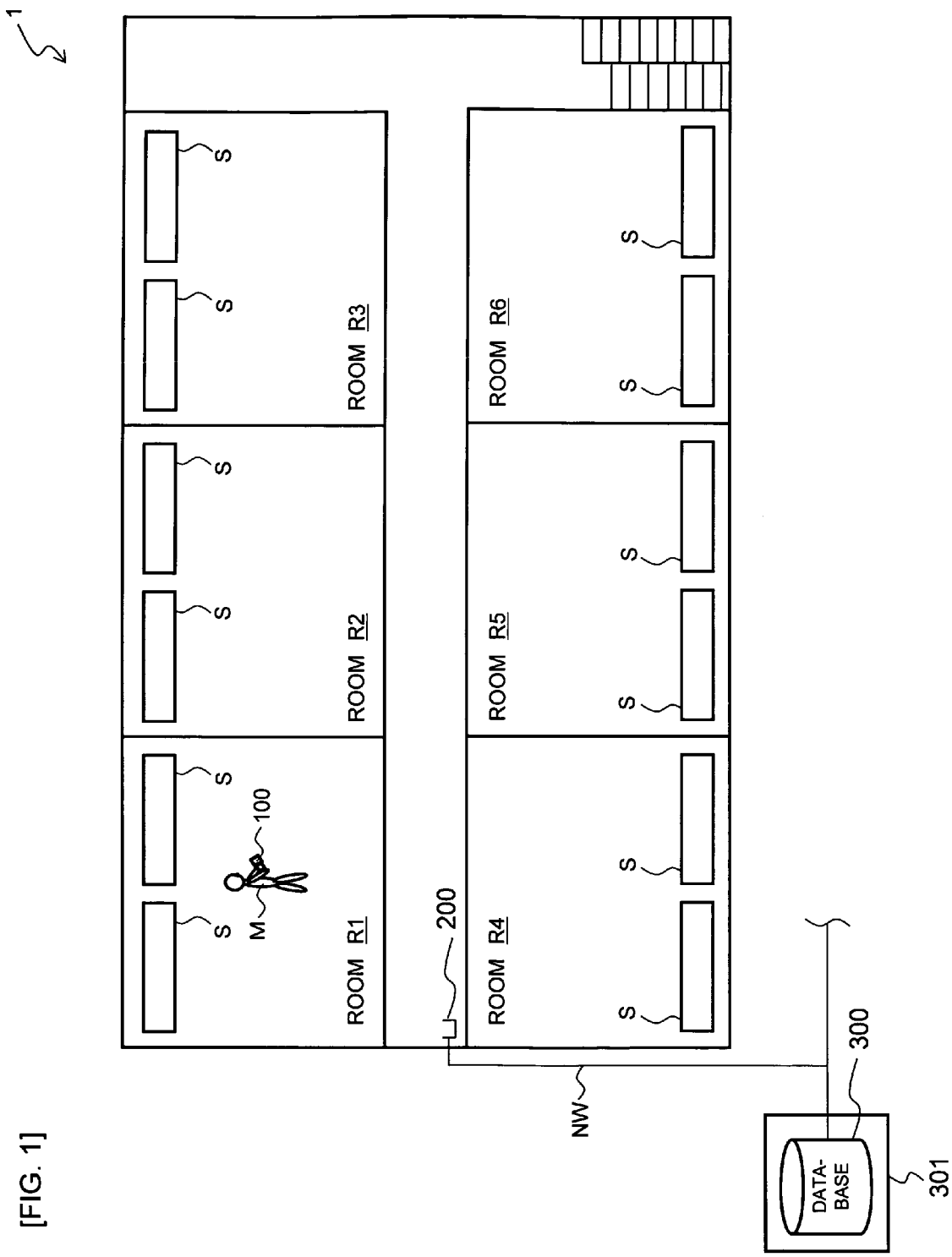

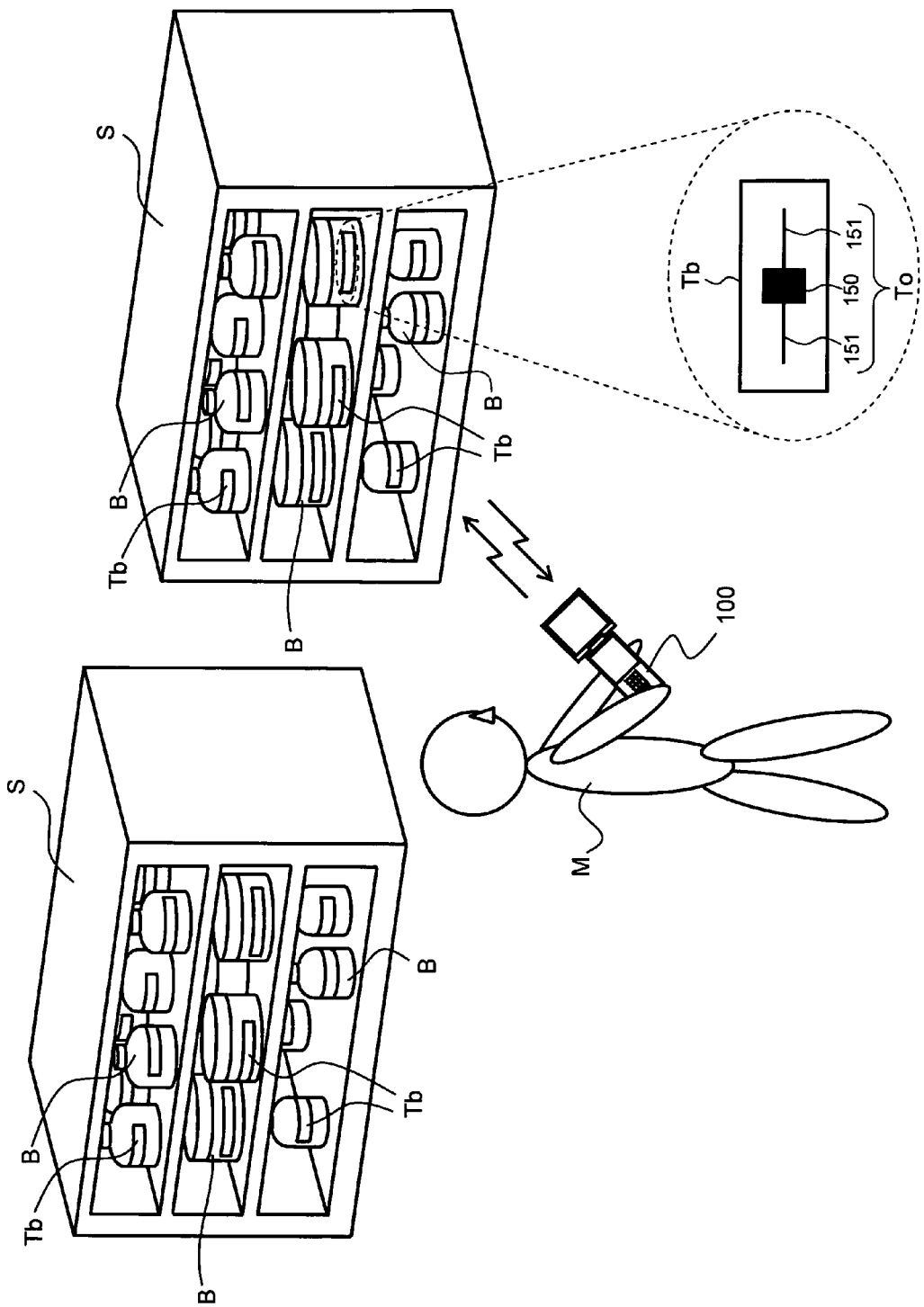
[FIG. 2]

[FIG. 3A]
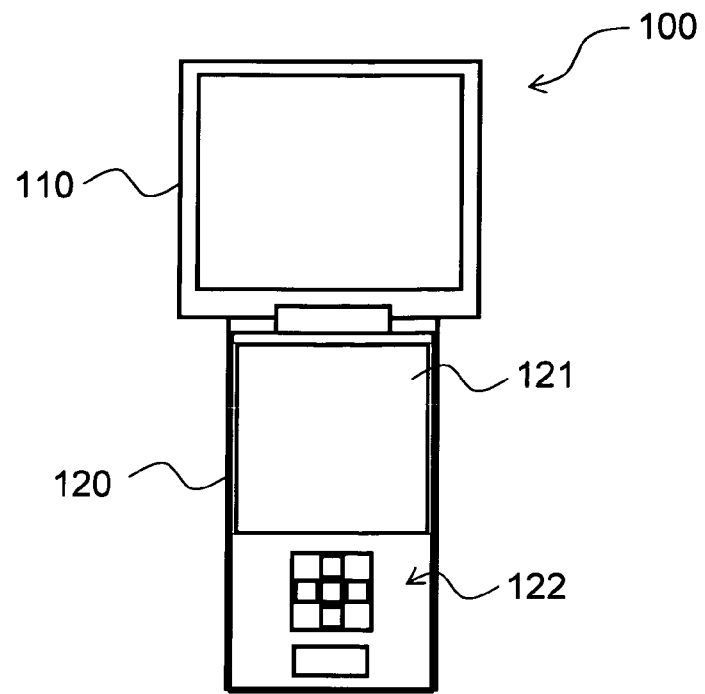
[FIG. 3B]
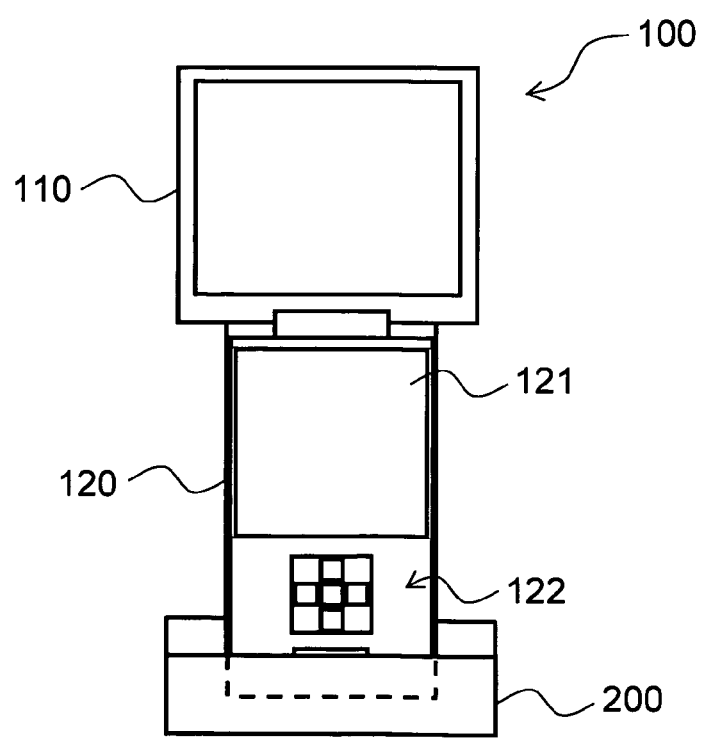

[FIG. 4A]
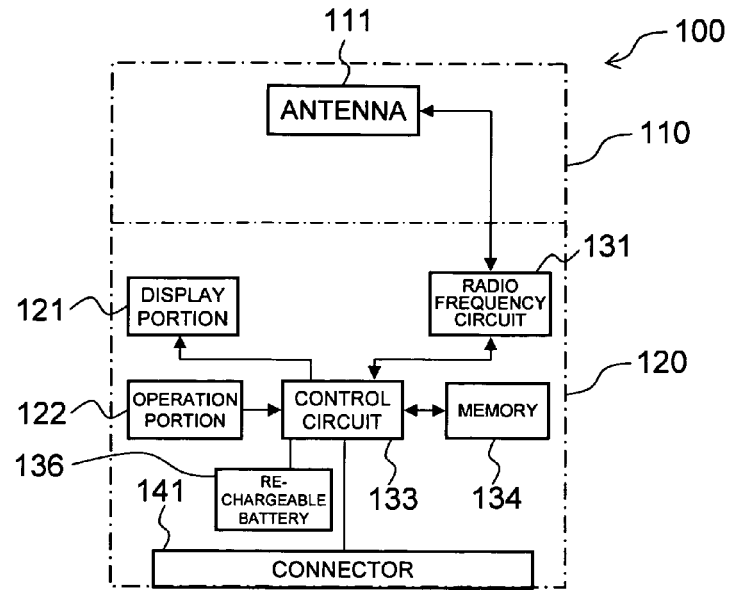
[FIG. 4B]
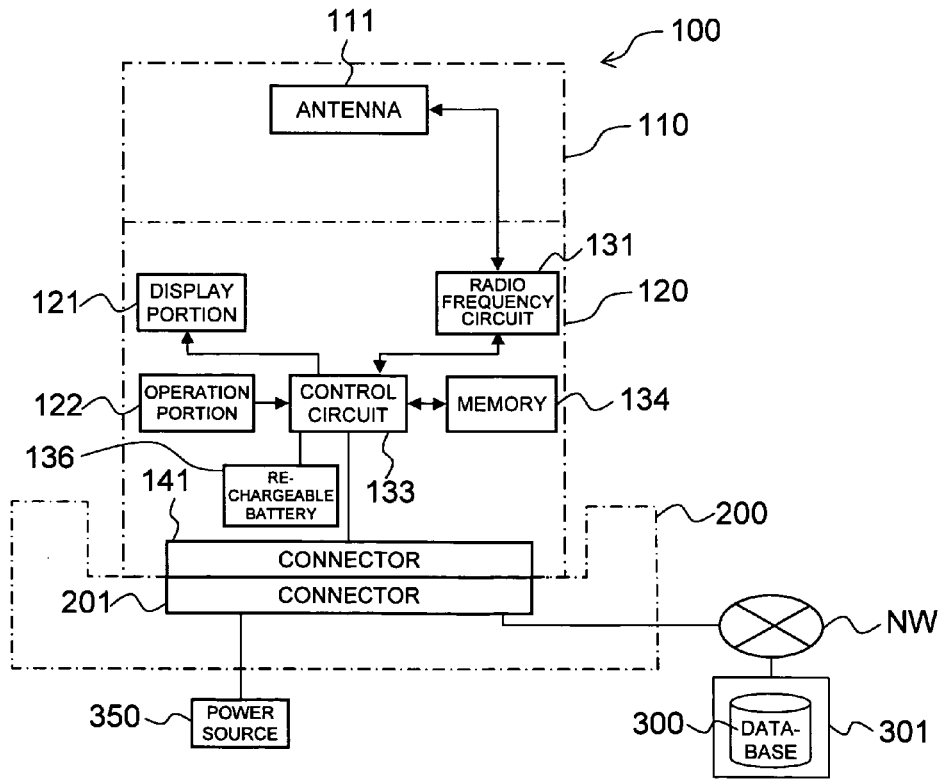

[FIG. 5]
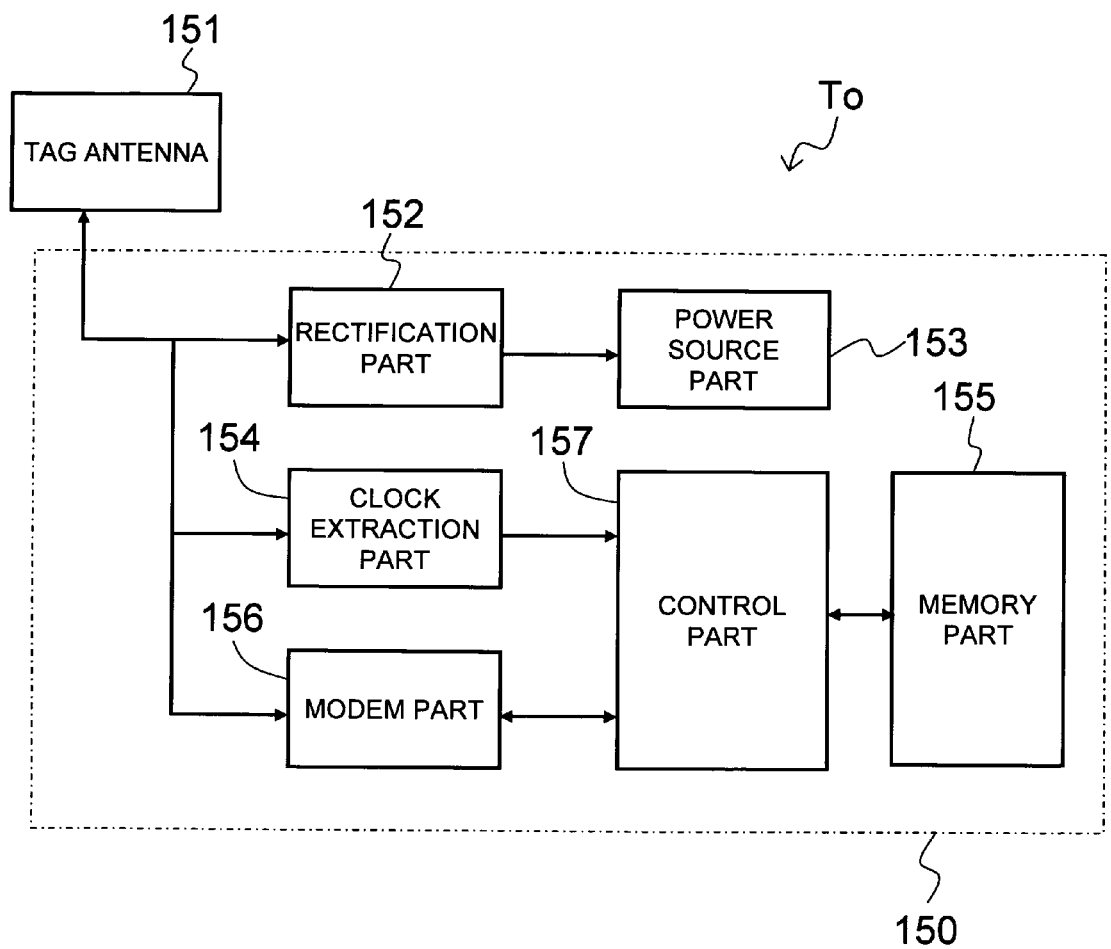

[FIG. 6]

ARTICLE NUMBER LIST

|  | NAME | NUMBER OF ARTICLES (PIECES) |
|---|---|---|
| ROOM R1 | room A | 300 |
| ROOM R2 | room B | 100 |
| ROOM R3 | room C | 250 |
| ROOM R4 | room D | 500 |
| ROOM R5 | room E | 450 |
| ROOM R6 | room F | 150 |

[FIG. 7A]
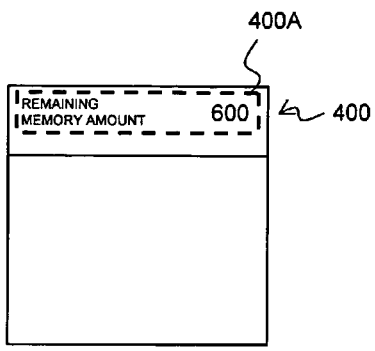
[FIG. 7D]
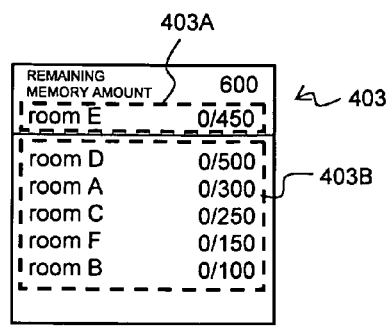
START INVENTORY
[FIG. 7B]
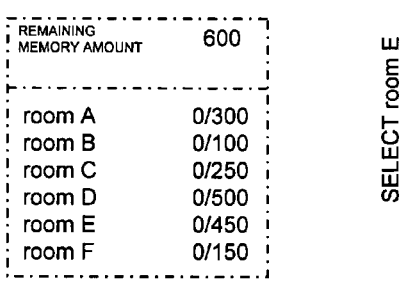
SELECT room E
[FIG. 7E]
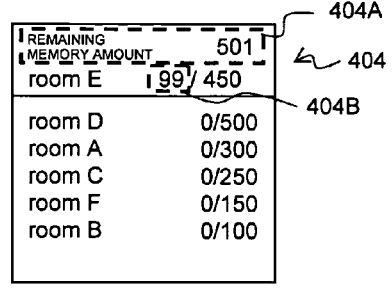
ARRANGE AND DISPLAY IN DESCENDING ORDER OF THE NUMBER OF ARTICLES
[FIG. 7C]
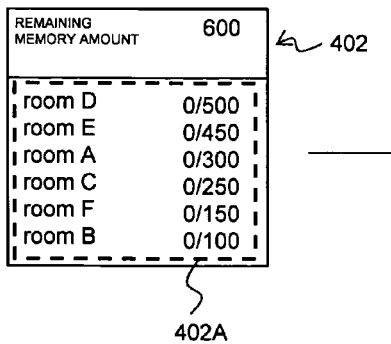
[FIG. 7F]
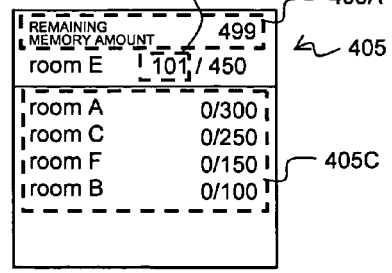

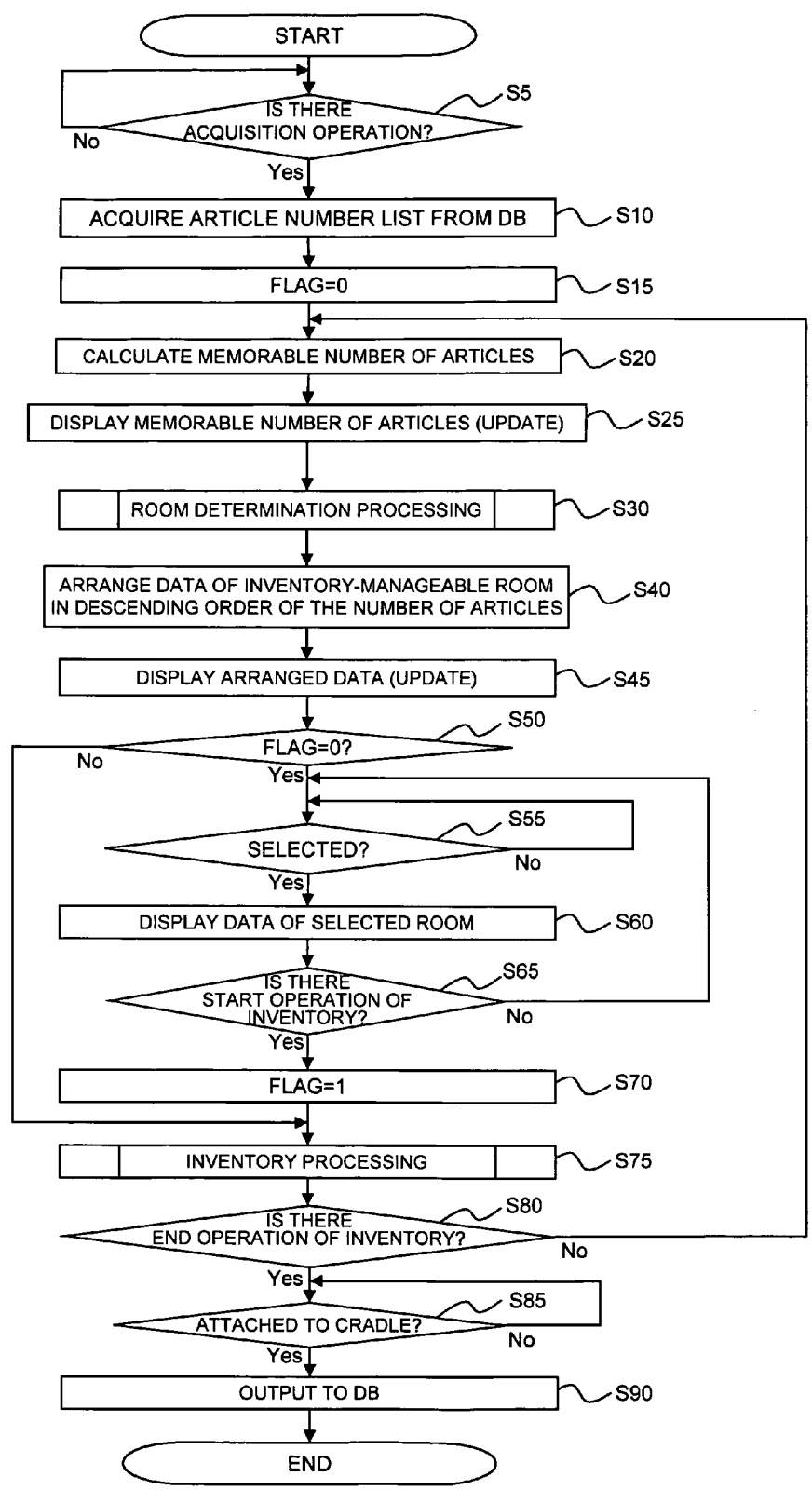
[FIG. 8]

[FIG. 9]
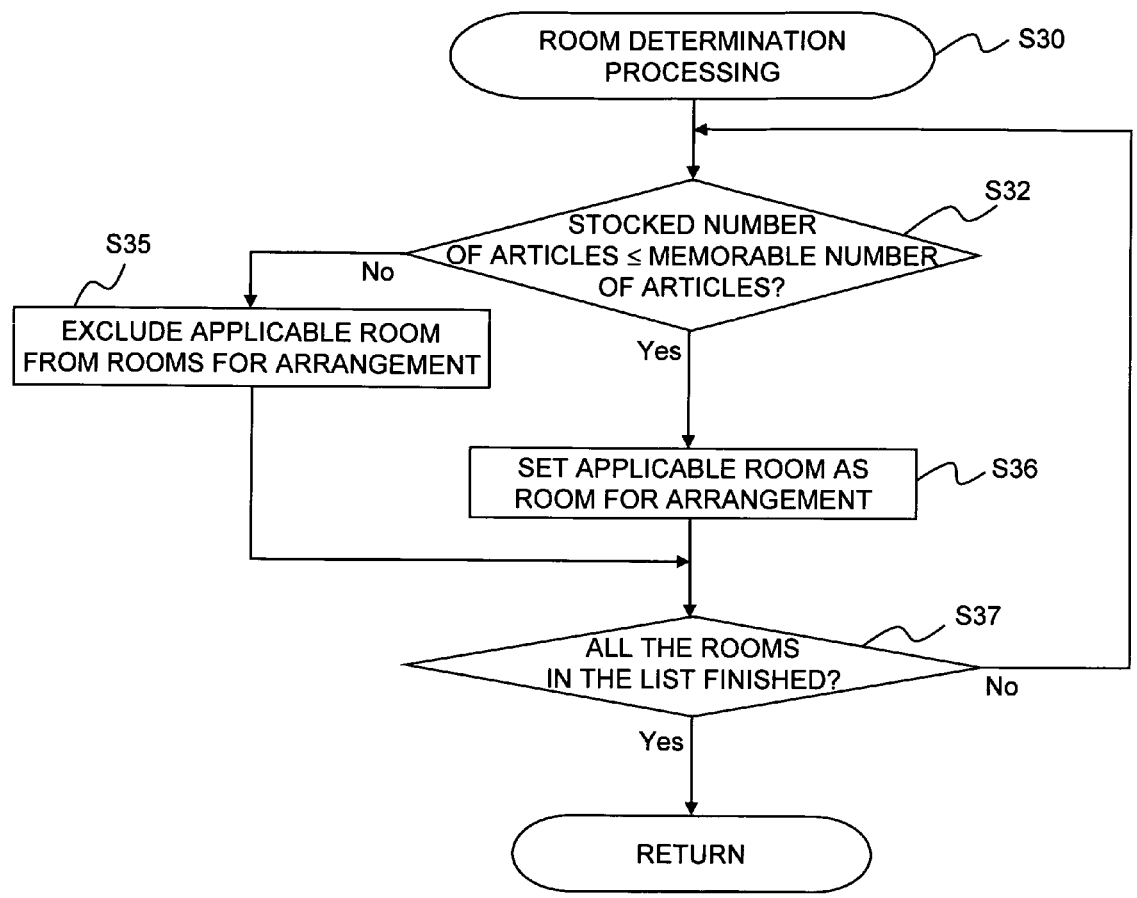

[FIG. 10]
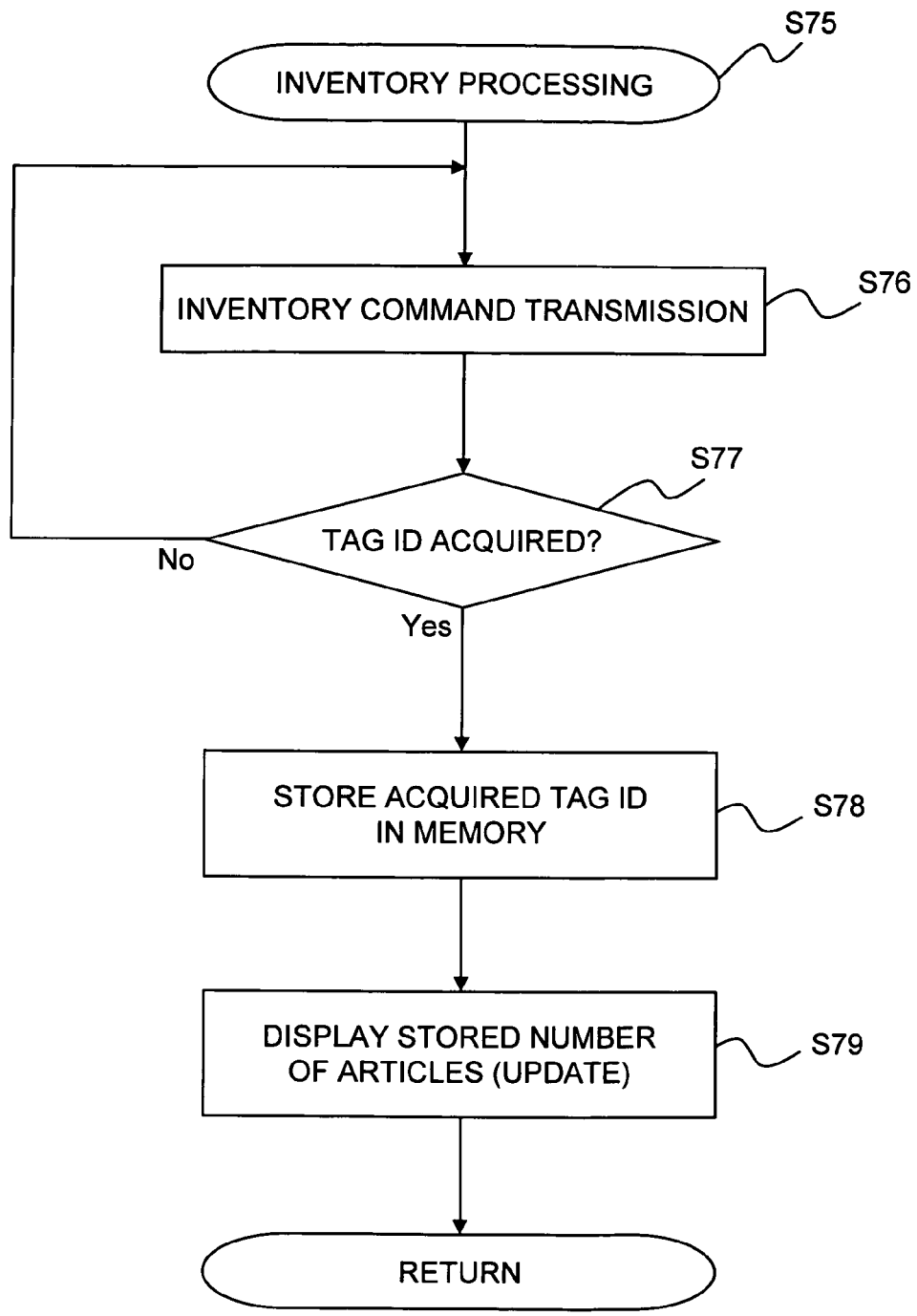

[FIG. 11]

ARTICLE NUMBER LIST

|  | NAME | NUMBER OF ARTICLES (PIECES) | TIME AND DATE OF PREVIOUS INVENTORY |
|---|---|---|---|
| ROOM R1 | room A | 300 | 13:00, JULY 21, 2008 |
| ROOM R2 | room B | 100 | 13:00, JULY 22, 2008 |
| ROOM R3 | room C | 250 | 13:00, JULY 23, 2008 |
| ROOM R4 | room D | 500 | 13:00, JULY 18, 2008 |
| ROOM R5 | room E | 450 | 13:00, JULY 19, 2008 |
| ROOM R6 | room F | 150 | 13:00, JULY 20, 2008 |

[FIG. 12A]

REMAINING MEMORY AMOUNT 600 — 410 (400A)

[FIG. 12B]

| REMAINING MEMORY AMOUNT | 600 |
|---|---|
| room A | 0/300 |
| room B | 0/100 |
| room C | 0/250 |
| room D | 0/500 |
| room E | 0/450 |
| room F | 0/150 |

ARRANGE AND DISPLAY IN CHRONOLOGICAL ORDER OF PREVIOUS INVENTORY EXECUTION TIME AND DATE

[FIG. 12C]

| REMAINING MEMORY AMOUNT | 600 | — 412 |
|---|---|---|
| room D | 0/500 | |
| room E | 0/450 | |
| room F | 0/150 | |
| room A | 0/300 | |
| room B | 0/100 | |
| room C | 0/250 | |

412A

SELECT room E

[FIG. 12D]

| REMAINING MEMORY AMOUNT | 600 | — 413 |
|---|---|---|
| room E | 0/450 | |
| room D | 0/500 | |
| room F | 0/150 | |
| room A | 0/300 | |
| room B | 0/100 | |
| room C | 0/250 | |

START INVENTORY

[FIG. 12E]

| REMAINING MEMORY AMOUNT | 501 | — 414 |
|---|---|---|
| room E | 99/450 | |
| room D | 0/500 | |
| room F | 0/150 | |
| room A | 0/300 | |
| room B | 0/100 | |
| room C | 0/250 | |

[FIG. 12F]

| REMAINING MEMORY AMOUNT | 499 | — 415 |
|---|---|---|
| room E | 101/450 | |
| room F | 0/150 | |
| room A | 0/300 | |
| room B | 0/100 | |
| room C | 0/250 | |

[FIG. 13]
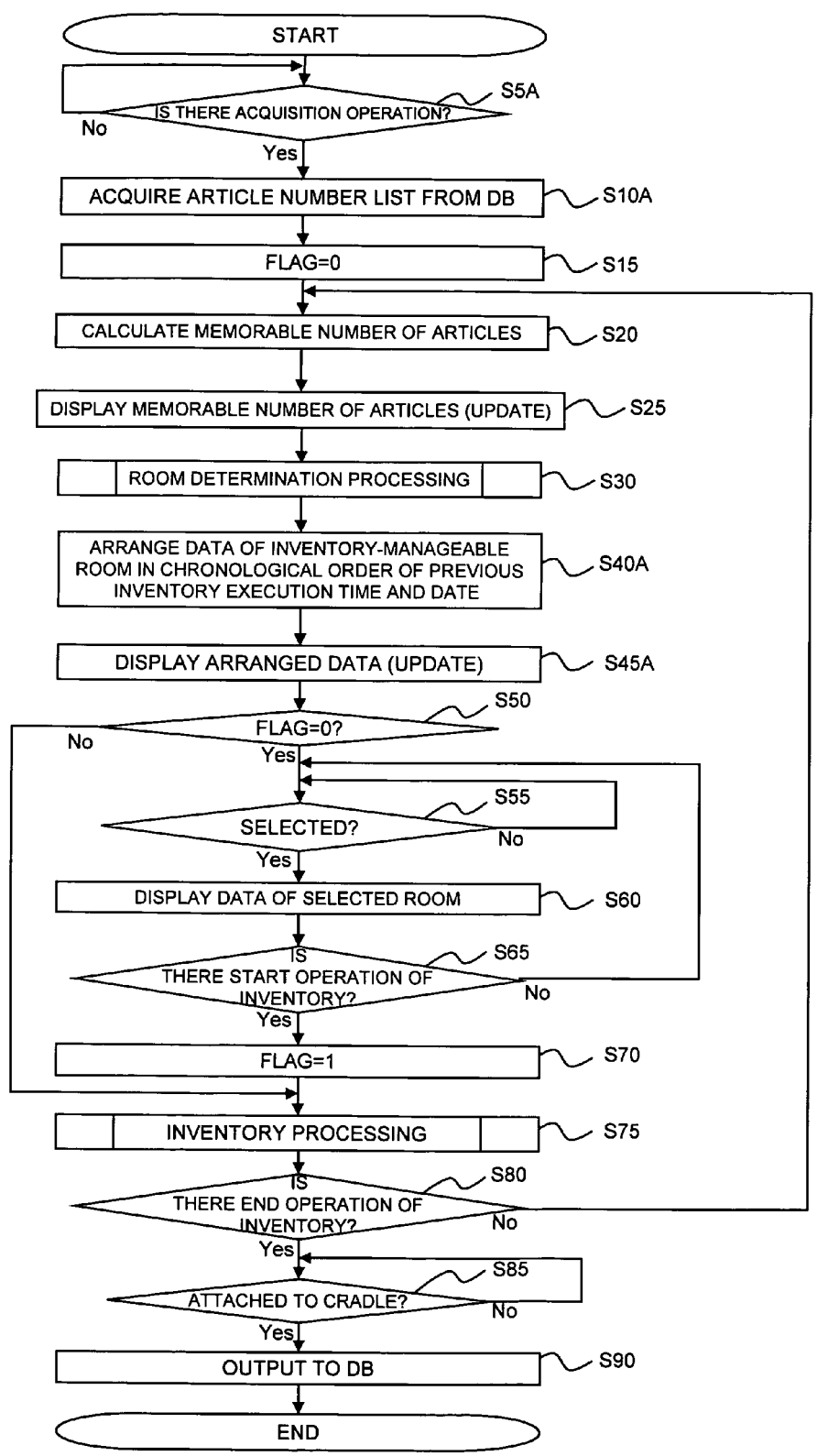

[FIG. 14]

ARTICLE NUMBER LIST

|  | NAME | NUMBER OF ARTICLES (PIECES) | INDEX OF PRIORITY |
|---|---|---|---|
| ROOM R1 | room A | 300 | 2 |
| ROOM R2 | room B | 100 | 5 |
| ROOM R3 | room C | 250 | 1 |
| ROOM R4 | room D | 500 | 4 |
| ROOM R5 | room E | 450 | 3 |
| ROOM R6 | room F | 150 | 6 |

[FIG. 15A]

| REMAINING MEMORY AMOUNT | 600 |
|---|---|

| REMAINING MEMORY AMOUNT | 600 |
|---|---|
| room A | 0/300 |
| room B | 0/100 |
| room C | 0/250 |
| room D | 0/500 |
| room E | 0/450 |
| room F | 0/150 |

ARRANGE AND DISPLAY IN DESCENDING ORDER OF INDEX OF PRIORITY

[FIG. 15C]

| REMAINING MEMORY AMOUNT | 600 |
|---|---|
| room C | 0/250 |
| room A | 0/300 |
| room E | 0/450 |
| room D | 0/500 |
| room B | 0/100 |
| room F | 0/150 |

422, 422A

SELECT room E

[FIG. 15D]

| REMAINING MEMORY AMOUNT | 600 |
|---|---|
| room E | 0/450 |
| room C | 0/250 |
| room A | 0/300 |
| room D | 0/500 |
| room B | 0/100 |
| room F | 0/150 |

423

START INVENTORY

[FIG. 15E]

| REMAINING MEMORY AMOUNT | 501 |
|---|---|
| room E | 99/450 |
| room C | 0/250 |
| room A | 0/300 |
| room D | 0/500 |
| room B | 0/100 |
| room F | 0/150 |

| REMAINING MEMORY AMOUNT | 499 |
|---|---|
| room E | 101/450 |
| room C | 0/250 |
| room A | 0/300 |
| room B | 0/100 |
| room F | 0/150 |

425

[FIG. 16]
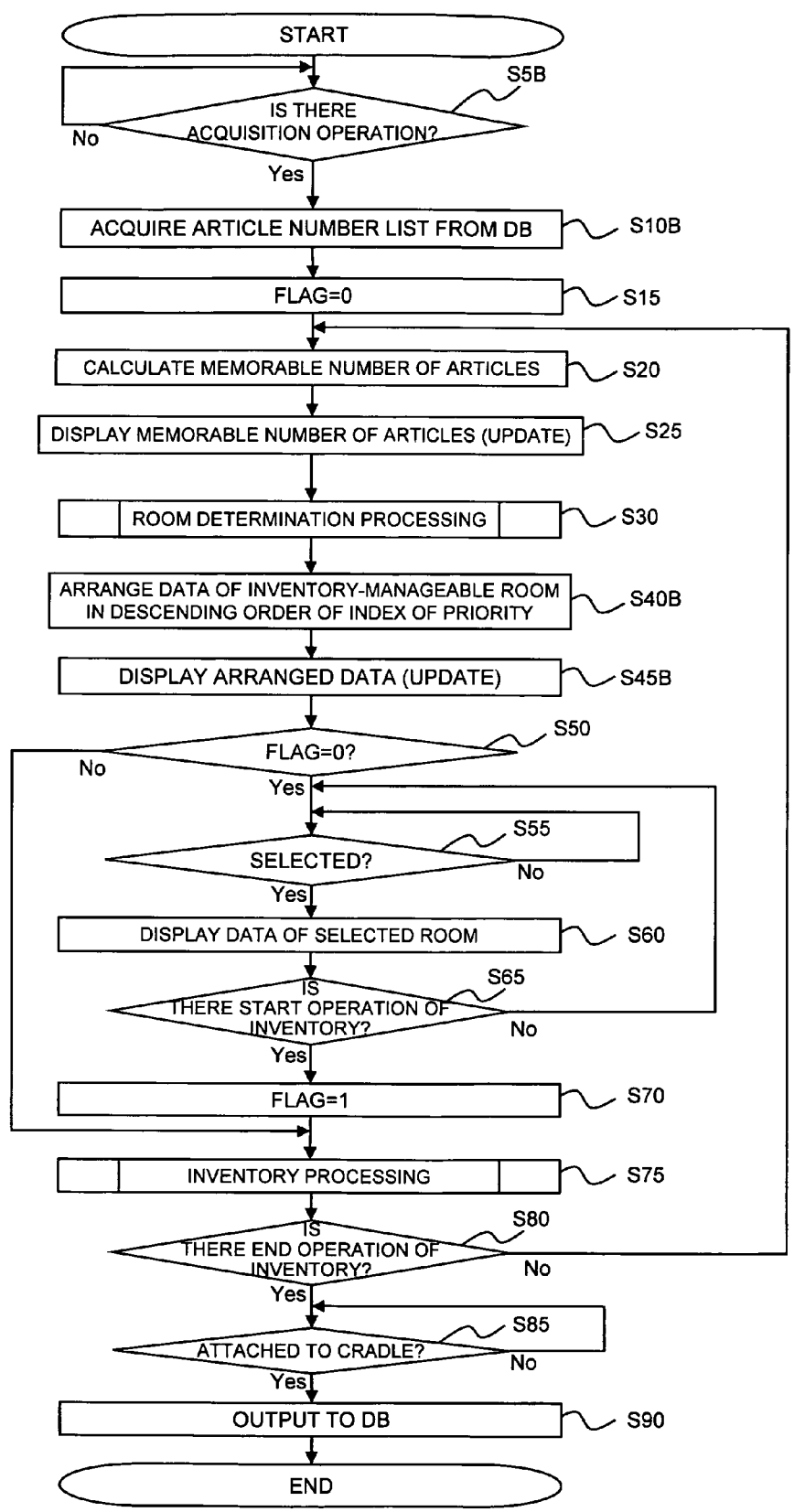

[FIG. 17]

ARTICLE NUMBER LIST

|  | NAME | NUMBER OF ARTICLES (PIECES) | DISTANCE COMPARISON DATA |
|---|---|---|---|
| ROOM R1 | room A | 300 | ROOM R2 < ROOM R4 < ROOM R5 < ROOM R3 < ROOM R6 |
| ROOM R2 | room B | 100 | ROOM R1 < ROOM R3 < ROOM R5 < ROOM R4 < ROOM R6 |
| ROOM R3 | room C | 250 | ROOM R2 < ROOM R6 < ROOM R5 < ROOM R1 < ROOM R4 |
| ROOM R4 | room D | 500 | ROOM R1 < ROOM R5 < ROOM R2 < ROOM R6 < ROOM R3 |
| ROOM R5 | room E | 450 | ROOM R2 < ROOM R4 < ROOM R6 < ROOM R1 < ROOM R3 |
| ROOM R6 | room F | 150 | ROOM R3 < ROOM R5 < ROOM R2 < ROOM R4 < ROOM R1 |

[FIG. 18A]
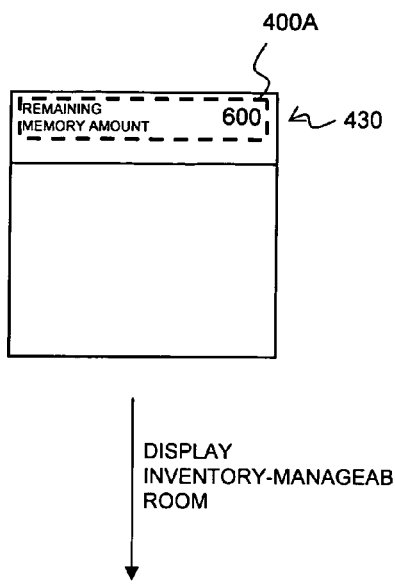
↓ DISPLAY INVENTORY-MANAGEABLE ROOM
[FIG. 18B]
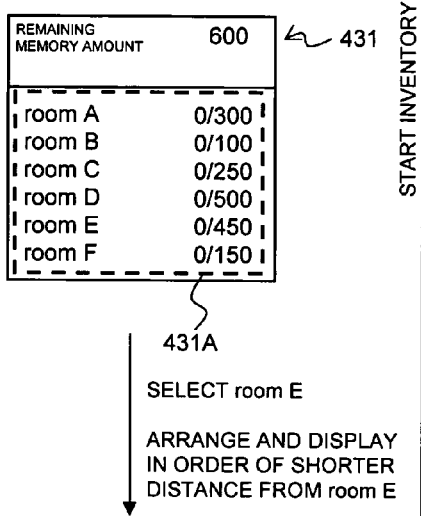
↓ SELECT room E
ARRANGE AND DISPLAY IN ORDER OF SHORTER DISTANCE FROM room E
[FIG. 18C]
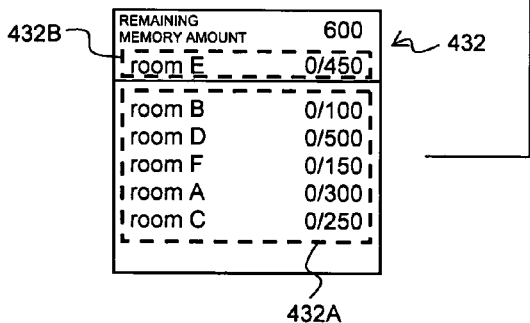
[FIG. 18D]
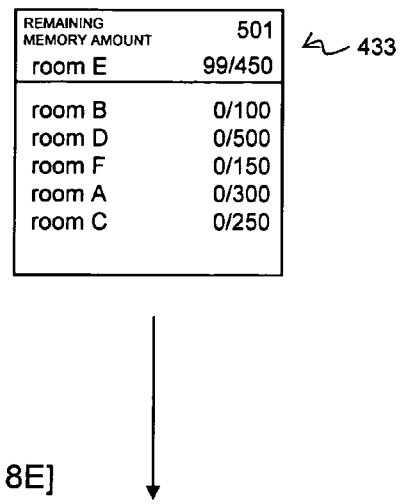
↓
[FIG. 18E]
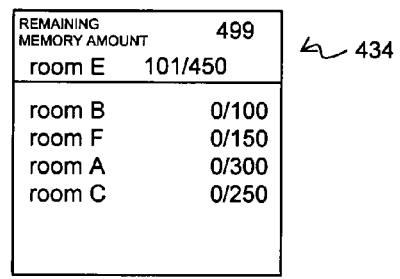

[FIG. 19]
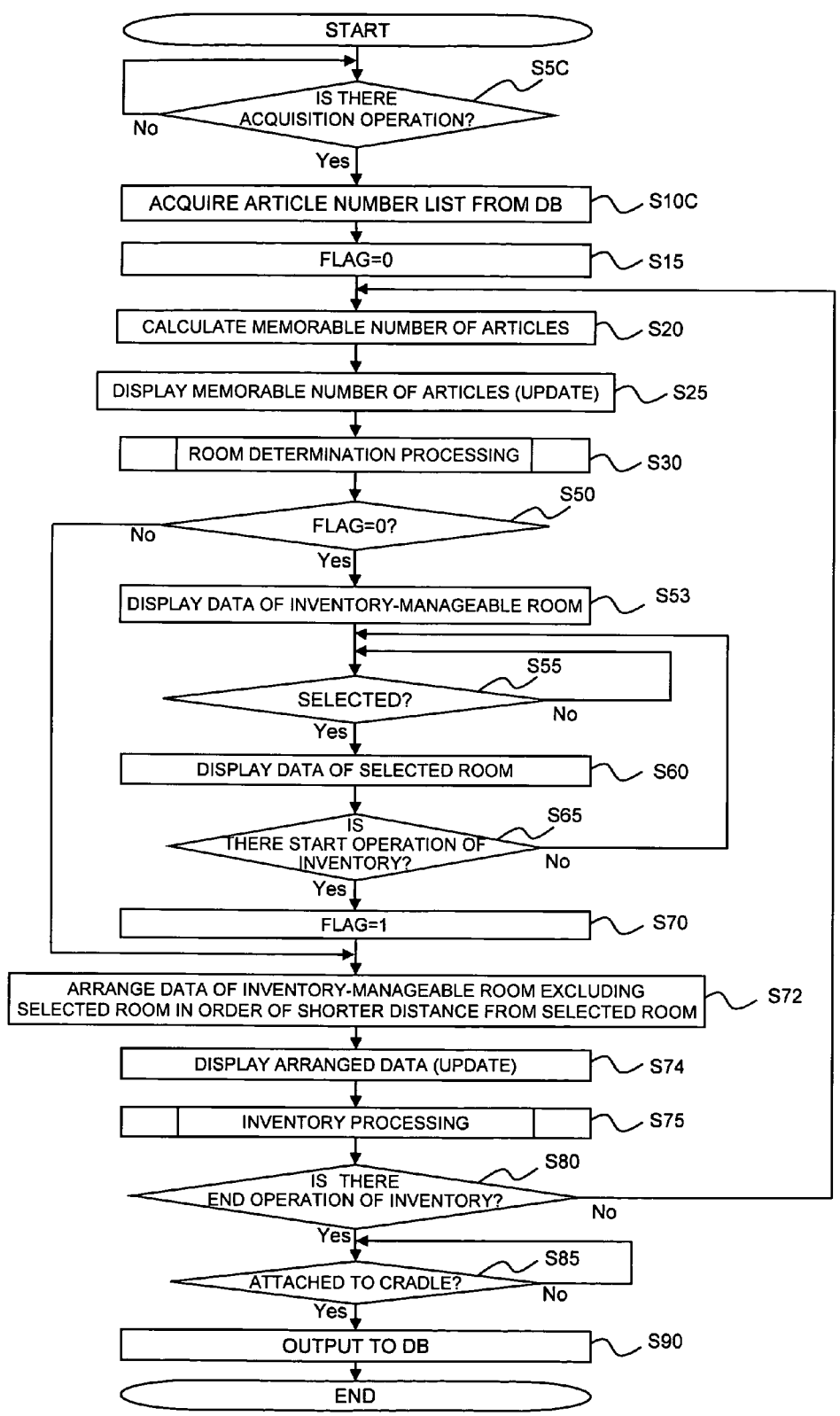

APPARATUS FOR COMMUNICATING WITH RFID TAG AND ARTICLE MANAGEMENT SYSTEM

CROSS-REFERENCE TO RELATED APPLICATIONS

This application claims priority from JP 2008-248830, filed Sep. 26, 2008, the contents of which are hereby incorporated by reference.

BACKGROUND OF THE INVENTION

1. Field of the Invention

The present invention relates to an apparatus for communicating with an RFID tag configured to read information with respect to an RFID tag capable of radio communication of information with outside, and an article management system using the apparatus.

2. Description of the Related Art

A Radio Frequency Identification (RFID) system configured to read/write information contactlessly between an RFID tag and a reader/writer is known. Even if the RFID tag is stained or arranged in a hidden place, Even if the RFID tag is stained or arranged in a hidden place, the RFID tag information of the IC circuit part can be accessed (for information reading/writing) from a reader/writer. Thus, the system has been put into practical use in various fields.

On the other hand, in industries such sales/distribution, an inventory to examine a stock of articles and raw material and to check a quantity is taken periodically. To provide the RFID tag on an article as an inventory target and to take an inventory by reading information from the RFID tag have been already proposed. For example, a prior art reference applied to an inventory system for book is described in JP, B, 4035972. In this prior art reference, information read from the RFID tag provided on each of a plurality of books via radio communication is compared with an actual quantity of books and by determining if there is a discrepancy between them or not, whether or not the RFID tags are affixed to all the books or not can be efficiently checked. In other words, if there are any books without the RFID tag affixed or not can be checked.

On the other hand, as a prior art reference relating to display of a memory capacity in a recording medium, JP, A, 2007-140677 is known, for example. This memory card according to the prior art reference is provided with a main body, electronic paper and a jog dial. The electronic paper displays index information of a file stored in a memory, and an available memory capacity is displayed by operating the jog dial.

Here, in the inventory work, a large number of articles are to be checked in general. In order to read tag identification information from each of RFID tag circuit elements provided at each article so as to check presence of the article, a memory capacity in which a large data amount in proportion to a number of articles can be stored is needed in a storage device such as a memory provided in an apparatus for communicating with an RFID tag.

If the memory capacity of the memory is not sufficient to store tag identification information according to the number of articles in an article storage location for inventory, storing in the memory becomes impossible in the middle of the inventory work, and the inventory work might be interrupted. In order to avoid such interruption of the inventory work, it is necessary to determine if a memory capacity of a memory usable in the apparatus for communicating with an RFID tag is sufficient for, that is, larger than, the memory capacity to be consumed in the inventory work to be started so as to see if the inventory can be taken without interruption. If the usable memory capacity is not sufficient for the number of articles in the article storage location, such a measure should be taken that the inventory work is not to be taken in the article storage location (will be taken later).

The prior art reference JP, B, 4035972 relating to the inventory work merely compares the read information with the actual quantity of the articles and does not make comparison on the memory capacity of the memory as above. The prior art reference JP, A, 2007-140677 merely displays a size of the available memory capacity, and no consideration is given to comparison between the usable memory capacity and the memory capacity to be consumed by the inventory work.

As described above, in the prior art references, no particular consideration is given to a point that interruption of the inventory work is avoided and smooth inventory work by an operator is ensured.

SUMMARY OF THE INVENTION

The present invention has an object to provide an apparatus for communicating with an RFID tag and an article management system that can ensure smooth inventory work by an operator and improve convenience.

BRIEF DESCRIPTION OF THE DRAWING

FIG. 1 is a conceptual explanatory diagram of an article management system in one embodiment of the present invention.

FIG. 2 is a perspective view illustrating a state in which an operator is carrying out an inventory work in a room.

FIG. 3A is a diagram illustrating an entire structure of a reader.

FIG. 3B is a diagram illustrating an entire structure of a reader.

FIG. 4A is a functional block diagram illustrating a functional configuration of a reader.

FIG. 4B is a functional block diagram illustrating a functional configuration of a reader.

FIG. 5 is a block diagram illustrating a functional configuration of an RFID tag circuit element for article.

FIG. 6 conceptually illustrates an article number list.

FIG. 7A is a diagram illustrating a transition state of a display screen displayed on a display portion of a reader.

FIG. 7B is a diagram illustrating a transition state of a display screen displayed on a display portion of a reader.

FIG. 7C is a diagram illustrating a transition state of a display screen displayed on a display portion of a reader.

FIG. 7D is a diagram illustrating a transition state of a display screen displayed on a display portion of a reader.

FIG. 7E is a diagram illustrating a transition state of a display screen displayed on a display portion of a reader.

FIG. 7F is a diagram illustrating a transition state of a display screen displayed on a display portion of a reader.

FIG. 8 is a flowchart illustrating a control procedure executed by a control circuit of a reader.

FIG. 9 is a flowchart illustrating a control procedure at Step S30.

FIG. 10 is a flowchart illustrating a control procedure at Step S75.

FIG. 11 conceptually illustrates an article number list in a variation arranged and displayed in a chronological order of a previous inventory execution time and date.

FIG. 12A is a diagram illustrating a transition state of a display screen displayed on a display portion of a reader.

FIG. 12B is a diagram illustrating a transition state of a display screen displayed on a display portion of a reader.

FIG. 12C is a diagram illustrating a transition state of a display screen displayed on a display portion of a reader.

FIG. 12D is a diagram illustrating a transition state of a display screen displayed on a display portion of a reader.

FIG. 12E is a diagram illustrating a transition state of a display screen displayed on a display portion of a reader.

FIG. 12F is a diagram illustrating a transition state of a display screen displayed on a display portion of a reader.

FIG. 13 is a flowchart illustrating a control procedure executed by a control circuit of a reader.

FIG. 14 conceptually illustrates an article number list in a variation arranged and displayed in a descending order of an index of priority.

FIG. 15A is a diagram illustrating a transition state of a display screen displayed on a display portion of a reader.

FIG. 15B is a diagram illustrating a transition state of a display screen displayed on a display portion of a reader.

FIG. 15C is a diagram illustrating a transition state of a display screen displayed on a display portion of a reader.

FIG. 15D is a diagram illustrating a transition state of a display screen displayed on a display portion of a reader.

FIG. 15E is a diagram illustrating a transition state of a display screen displayed on a display portion of a reader.

FIG. 15F is a diagram illustrating a transition state of a display screen displayed on a display portion of a reader.

FIG. 16 is a flowchart illustrating a control procedure executed by a control circuit of a reader.

FIG. 17 conceptually illustrates an article number list in a variation arranged and displayed in order of shorter distance from a reference position.

FIG. 18A is a diagram illustrating a transition state of a display screen displayed on a display portion of a reader.

FIG. 18B is a diagram illustrating a transition state of a display screen displayed on a display portion of a reader.

FIG. 18C is a diagram illustrating a transition state of a display screen displayed on a display portion of a reader.

FIG. 18D is a diagram illustrating a transition state of a display screen displayed on a display portion of a reader.

FIG. 18E is a diagram illustrating a transition state of a display screen displayed on a display portion of a reader.

FIG. 19 is a flowchart illustrating a control procedure executed by a control circuit of a reader.

DETAILED DESCRIPTION OF THE PREFERRED EMBODIMENTS

An embodiment of the present invention will be described below referring to attached drawings.

FIG. 1 is a conceptual explanatory diagram of an article management system of this embodiment.

In FIG. 1, an article management system 1 of this embodiment comprises a server 301 provided with a database 300 and a reader 100 configured capable of information transmission and reception with the server 301. The reader 100 is capable of information transmission and reception with the database 300 through a network NW by being attached to a cradle 200. The reader 100, for example, may be connected via network to the database 300 through wireless LAN. In the database 300, each name of a plurality of rooms R1 to R6 storing articles B and a corresponding number of articles B are stored in association with each other (details will be described later).

In this embodiment, an operator M takes an inventory of each storage shelf S using the reader 100 in rooms R1 to R6 (hereinafter collectively referred merely to "room R" as appropriate).

FIG. 2 is a perspective view illustrating a state in which the operator is carrying out an inventory work in the room R.

In FIG. 2, in this embodiment, each room R has a plurality of the storage shelves S. In each of the storage shelves S, a plurality of the articles B is stored, and an article tag Tb is affixed to each of the articles B. The article tag Tb has an RFID tag circuit element To for article provide with a tag antenna 151 and an IC circuit part 150 (See FIG. 5, which will be described later). Thus, since the RFID tag circuit element To for article is provided on a base material, not particularly shown, the RFID tag circuit element can be affixed to the article B. The operator M reads information via radio communication from the RFID tag circuit element To for article provided on the article B stored in the storage shelf S using the reader 100 so as to take an inventory of each storage shelf S.

FIG. 3A shows an entire structure of the reader 100.

In FIG. 3A, the reader 100 is configured as a portable type, so-called handheld type, that carries out information reading/writing via radio communication with respect to the RFID tag circuit element To for article in this example. The reader 100 has an antenna portion 110 provided with an apparatus antenna 111 (See FIG. 4, which will be described later) configured to conduct radio communication and a main body portion 120 provided at a lower part of the antenna portion 110. The main body portion 120 has a display portion 121 arranged on an upper side of the main body portion 120 in the figure and configured to display various types of information and an operation portion 122 arranged on a lower side of the display portion 121 in the figure and configured to receive various operation inputs. The reader 100 is capable of being attached to the cradle 200 as shown in FIG. 3B so as to conduct information transmission and reception with the database 300 as described above. At that time, charging is also possible, which will be described later.

FIG. 4A shows a functional configuration of the reader 100. A state of the reader 100 being attached to the cradle 200 is also shown in FIG. 4B. Arrows shown in the FIG. 4A illustrate an example of flows of signals and do not limit the flow direction of the signals.

In FIGS. 4A and 4B, the reader 100 has the display portion 121, the operation portion 122, the apparatus antenna 111, a radio frequency circuit 131, a control circuit 133, a memory 134, a rechargeable battery 136, and a connector 141. The apparatus antenna 111 is configured to transmit and receive a signal via radio communication with the RFID tag circuit element To for article as a communication target. The radio frequency circuit 131 is configured to make an access to the IC circuit part 150 of the RFID tag circuit element To for article through the apparatus antenna 111 via radio communication and to process a signal read from the RFID tag circuit element To for article. The control circuit 133 is configured to control an entire reader 100 including the radio frequency circuit 131. The memory 134 is configured to store a tag ID of each of the RFID tag circuit elements To for article. The rechargeable battery 136 is configured to supply power to the control circuit 133 and, for example, the display portion 121, in use. The connector 141 is connected to a connector 201 of the cradle 200 when being attached to the cradle 200. The memory 134 is such as a RAM or a hard disk, for example.

Incidentally, as shown in FIG. 4B, when the reader 100 is attached to the cradle 200, the connector 141 of the reader 100 is connected to the connector 201 of the cradle 200, and the control circuit 133 is connected to the database 300 of the server 301 through the network NW. As a result, the control circuit 133 can obtain a name of each room R and a corresponding number of articles B in association with each other with regard to each of the plurality of rooms R storing the articles B for inventory, stored in the database 300.

Also, as shown in FIG. 4B, when the reader 100 is attached to the cradle 200, power of an outside power source 350 is supplied to the reader 100 through the connectors 201, 141. As a result, power of the outside power source 350 is supplied to the control circuit 133 and, for example, the display portion 121, and power of the outside power source 350 is supplied to the rechargeable battery so as to charge it while the reader 100 is not driven. On the other hand, as shown in FIG. 4A, if the reader 100 is removed from the cradle 200, power is supplied to the control circuit 133 and, for example, the display portion 121, from the rechargeable battery 136.

In FIG. 5, the radio frequency circuit 131 accesses information of the IC circuit part 150 of the RFID tag circuit element To for article through the apparatus antenna 111, reads information by processing a signal read from the IC circuit part 150 of the RFID tag circuit element To for article and also creates various commands for accessing the IC circuit part 150 of the RFID tag circuit element To.

FIG. 5 shows an example of a functional configuration of the RFID tag circuit element To for article. Arrows shown in the figure illustrate an example of flows of signals and do not limit the flow direction of the signals.

In FIG. 5, the RFID tag circuit element To for article has the tag antenna 151 configured to transmit/receive a signal contactlessly with the apparatus antenna 111 of the reader 100 as described above and the IC circuit part 150 connected to the tag antenna 151.

The IC circuit part 150 comprises a rectification part 152, a power source part 153, a clock extraction part 154, a memory part 155, a modem part 156, and a control part 157. The rectification part 152 rectifies an interrogation wave received by the tag antenna 151. The power source part 153 accumulates energy of the interrogation wave rectified by the rectification part 152 so as to make it a driving power supply. The clock extraction part 154 extracts a clock signal from the interrogation wave received by the tag antenna 151 so as to supply it to a control part 157. The memory part 155 is able to store a predetermined information signal. The modem part 156 is connected to the tag antenna 151. The control part 157 controls operation of the RFID tag circuit element To for article through the memory part 155, the clock extraction part 154, the modem part 156, for example.

The modem part 156 demodulates a communication signal from the apparatus antenna 111 of the reader 100 received by the tag antenna 151, modulates a reply signal from the control part 157 and transmits it as a response wave from the tag antenna 151. The response wave is a signal including a tag ID.

The clock extraction part 154 extracts a clock component from a received signal and extracts a clock to the control part 157 and supplies a clock corresponding to a frequency of the clock component of the received signal to the control part 157.

The control part 157 interprets a received signal demodulated by the modem part 156, generates a reply signal on the basis of the information signal stored in the memory part 155, and executes basic control such as control to return this reply signal from the tag antenna 151 by the modem part 156.

Here, the most distinctive characteristic of the reader 100 of this embodiment is that a number of RFID tag circuit elements To for article capable of newly storing tag IDs is calculated on the basis of a remaining memory capacity of the memory 134 and that the room R having a corresponding number of articles B not more than a calculated number of the RFID tag circuit elements To for article as an inventory-manageable room. Details will be described below in order.

FIG. 6 conceptually shows data contents of an article number list including names of rooms R relating to each of the plurality of rooms R storing the articles B and a corresponding number of articles B associated with them, stored in the database 300 of the server 301.

In FIG. 6, the article number list includes six room names relating to the rooms R storing the articles B for inventory and a corresponding number of articles B. In this example, the number of articles B stored in all the storage shelves S of the room R1 (name "roomA") is 300 (pieces). Similarly, the number of articles B of the room R2 (name "roomB") is 100 (pieces), the number of articles B of the room R3 (name "roomC") is 250 (pieces), the number of articles B of the room R4 (name "roomD") is 500 (pieces), the number of articles B of the room R5 (name "roomE") is 450 (pieces), and the number of articles B of the room R6 (name "roomF") is 150 (pieces).

The article number list includes the room names and a corresponding numbers of articles B, but not limited to the, data items other than the such as time and date of a previous inventory execution, an index of priority, distance comparison data from each room R, for example (See each of variations, which will be described later).

In this embodiment, display on the display portion 121 of the reader 100 appropriately changes according to an operation by the operator M at the operation portion 122. The operator M can sequentially perform various operations such as selection of the room R where the inventory work is to be started on the basis of displayed contents on each of transit display screens 400 to 405. FIGS. 8A to 8F show transit states on the display screens 400 to 405 on the display portion 121 of the reader 100. However, FIG. 7B is not actually displayed as will be described later. FIGS. 8A to 8F are shown to change in a time series.

In this embodiment, on the basis of an appropriate operation by the operator (details will be described later) before the inventory work is started, the control circuit 133 of the reader 100 calculates a newly memorable number of articles B on the basis of the remaining memory capacity of the memory 134. In other words, the control circuit 133 calculates a number of RFID tag circuit elements To for article that can newly store tag IDs. FIG. 7A is the display screen 400 illustrating a calculation result. In the illustrated example, a case in which the remaining memory capacity of the memory 134 is 600 [KB] and a capacity of a tag ID of a single RFID tag circuit element To for article is 1 [KB] is used, and the number of newly memorable articles B is 600/1=600 [pieces]. As a result, a display area 400A in an uppermost stage on the display screen 400 displays "remaining memory amount 600".

After that, on the basis of the operation by the operator instructing an access to the database 300 (details will be described later), the control circuit 133 acquires the number of articles B stored in each room R for inventory taking from the database 300. Then, a number of stored articles B acquired as above (hereinafter referred to as "number of stored articles" as appropriate) and the newly memorable number of articles B (hereinafter referred to as "memorable number of articles" as appropriate) calculated as above are compared, and the room R with (number of stored articles)≦(memorable number of articles) (hereinafter referred to as "inventory-manageable room") is determined.

FIG. 7B shows an example of a number of stored articles in each of the rooms R1 to R6 (roomA to roomF) determined as an inventory-manageable room (=the number of stored articles is not more than 600) after being acquired from the database 300, and in this example, the number of stored articles of the room R1 (name "roomA") is 300, the number of stored articles of the room R2 (name "roomB") is 100, the number of stored articles of the room R3 (name "roomC") is 250, the number of stored articles of the room R4 (name "roomD") is 500, the number of stored articles of the room R5 (name "roomE") is 450, and the number of stored articles of the room R6 (name "roomF") is 150. In the illustration, a value of denominator indicates the number of stored articles as "0/300", and a value of numerator indicates a number of articles for which the reader 100 gets corresponding tag identification information through the inventory work and stores in the memory 134 (hereinafter referred to as "number of ID acquired articles"). Since the inventory has not been started yet at this time, a value of numerator is zero for all the rooms R. In this example, a state shown in FIG. 7B is not displayed on the display portion 121 of the reader 100. That is, the state is treated by only an internal processing in the control circuit 133 (See a single-dot chain line). Thus, after the display screen 400 in FIG. 7A, a display moves to the display screen 402 (See FIG. 7C), which will be described later.

When the number of stored articles of each room R determined as the inventory-manageable room is acquired as in FIG. 8B, the control circuit 133 arranges names of the inventory-manageable room R, a corresponding number of stored articles and a number of ID acquired articles in a descending order of the number of stored articles. FIG. 7C is a diagram illustrating the display screen 402 displayed on the display portion 121 at this time.

In FIG. 7C, on the display screen 402, number of memorable articles ("remaining memory amount 600"), names of rooms R determined as the inventory-manageable rooms, numbers of stored articles, and numbers of ID acquired articles are displayed. The names of rooms R, the numbers of stored articles, and the numbers of ID acquired articles are, as described above, arranged from an upper stage to a lower stage in a descending order of the number of stored articles. They are to visually notify data of the room R where the operator M is to start the inventory work, and in this example, the three are displayed in a set for each room R (hereinafter the three are collectively referred to as "work data every room").

The work data every room of each room R shown in FIG. 7C is arranged and displayed as "roomD 0/500" relating to the room R4, "roomE 0/450" relating to the room R5, "roomA 0/300" relating to the room R1, "roomC 0/250" relating to the room R3, "roomF 0/150" relating to the room R6, and "roomB 0/100" relating to the room R2 in a descending order of the number of articles B (See a display area 402A).

In a state in which the display screen 402 is displayed, if the operator M selects one room R to start the inventory work through an appropriate operation (details will be described later) on the operation portion 122, a display moves to the display screen 403 shown in FIG. 7D.

The display screen 403 in FIG. 7D shows an example in which the room R5 is selected on the display screen 402 in FIG. 8C. As shown in the figure, as the result of a selection, the work data every room corresponding to a selected room R5 "roomE 0/450" is displayed on a display area 403A at a lower part of the memorable number of articles "remaining memory amount 600". In other words, a display location is moved to the display area 403A close to an upper part after extraction from the display area 402A close to a lower part on the display portion 121. In addition, the work data every room of the rooms R1, R2, R3, R4 and R6 except the work data every room corresponding to a selected room R5 are displayed on a display area 403B at a lower part thereof.

Then, if the operator M starts the inventory work in the selected room R5 through an appropriate operation (details will be described alter) on the operation portion 122 in a state in which the display screen 403 is displayed, a tag ID of the RFID tag circuit element To for article provided on each of the articles B stored in the storage shelf S in the room R5 is acquired and the tag ID is stored in the memory 134.

If the inventory work is started as above and the tag ID of the RFID tag circuit element To for article is stored in the memory 134, a memory capacity is consumed, and the remaining memory capacity of the memory 134 is decreased. In accordance with that, the control circuit 133 calculates the memorable number of articles again on the basis of a decreased remaining memory capacity of the memory 134. In the example, since a capacity of the tag ID of an RFID tag circuit element To for article is 1 [KB], each time the tag ID is acquired from the RFID tag circuit element To for article of the article B in the room R5, the memorable number of articles is decreased by one. Also, along with that, the number of ID acquired articles in the room R5 is increased by one.

FIG. 7E shows a display screen 404 on the display portion 121 in a state in which after the inventory work is started, the tag IDs have been acquired from the RFID tag circuit elements To for article of 99 [pieces] of the articles B. That is, inventory has been completed for 99 [pieces] of the articles B.

On the display screen 404, the memorable number of articles "remaining memory amount 501" re-calculated according to acquisition of the 99 [pieces] of the tag IDs, that is, 501 by subtracting 99 from 600, is updated and displayed on a display area 404A, and the work data every room of the room R5 "roomE 99/450" is updated and displayed. That is, the number of ID acquired articles has been increased from 0 to 99 (See a display area 404B). On a lower part of the display area 404B, the work data every room of the rooms R1, R2, R3, R4 and R6 (similar to the display area 403B in FIG. 7D) are displayed.

As the inventory work further progresses from a state shown in FIG. 7E, since the tag IDs are further accumulated in the memory 134 and the memory capacity is further consumed, the remaining memory capacity is further decreased. The control circuit 133 continues re-calculation of the memorable number of article in the memory 134 while the remaining memory capacity of the memory 134 is being decreased as above and continues to compare a re-calculated memorable number of articles in the memory 134 with the number of stored articles of each room R described using FIG. 7A. With a decrease of the memorable number of articles, if the room R with (re-calculated memorable number of articles)≦(number of stored articles) emerges, the room R is excluded from a display target, that is, deleted and a display is updated on the display portion 121 since the inventory cannot be taken due to lack of the memory capacity.

FIG. 7F is a diagram illustrating an example of a display screen 405 in which display of a part of the rooms has been deleted as above. In this example, such a state is illustrated that as the result that an inventory of 101 [pieces] of the articles B has been completed in the room R5 (See a display area 405B), and the memorable number of articles becomes 499 (See a display area 405A), which is larger than the number of stored articles 500 [pieces] of the room R4, the room R4 has been excluded from the inventory-manageable rooms. In accordance with that, only the room R1, the room R2, the room R3, and the room R6 are determined as the inventory-manageable rooms after that. On a display area 405C close to a lower part of the display portion 121, only the work data every room corresponding to them is arranged and displayed from above to below in a descending order of the number of stored articles as "roomA 0/300" relating to the room R1, "roomC 0/250" relating to the room R3, "roomF 0/150" relating to the room R6, and "roomB 0/100" relating to the room R2.

FIG. 8 shows a control procedure executed by the control circuit 133 of the reader 100.

In FIG. 8, the control circuit 133 starts this flow ("START position") after the reader 100 is powered on. Otherwise, the control circuit 133 may be start the flow when an operation to start a reading processing of the RFID tag circuit element To in the operation portion 122 is carried out, for example.

First, at Step S5, the control circuit 133 determines if an operation to acquire the article number list relating to each of the plurality of rooms R1 to R6 storing the articles B from the database 300 of the server 301 has been carried out or not. The list includes names of the rooms R and a corresponding number of articles B associated with them (See FIG. 6). This determination may be made such that display prompting an operation by the operator M such as "The article number list is to be acquired?" is made on the display portion 121, for example, and the determination may be made on the basis of a signal input accordingly by the operator M using the operation portion 122. A routine stands by in a loop till the operation to acquire the article number list is carried out, and when the operation to acquire the article number list is carried out, the determination is satisfied, and the routine goes to Step S10. The determination at Step S5 may be made such that if the reader 100 has been attached to the cradle 200 or not. That is, if the reader is attached to the cradle 200, the determination is satisfied, and the routine goes to Step S10.

At Step S10, the control circuit 133 makes an access to the database 300 of the server 301 connected through the cradle 200 and the network NW so as to acquire the article number list. The step S10 functions as an article number information obtainment portion. This acquisition of the article number list may be made by manual input by the operator M using the operation portion 122 or may be acquired automatically by the control circuit 133 when the reader has been attached to the cradle 200.

After that, at Step S15, the control circuit 133 sets a FLAG indicating a start status of the inventory work to zero indicating that the inventory work has not been started, and the routine goes to Step S20.

At Step S20, the control circuit 133 calculates the memorable number of articles on the basis of the remaining memory capacity of the memory 134. The step S20 functions as a calculating portion. Specifically, by dividing the remaining memory capacity of the memory 134 by a length of information including the tag ID relating to a single article, the memorable number of articles can be obtained. After that, the routine goes to Step S25.

If this Step S20 is executed second time and after, since the determination at Step S80, which will be described, is not satisfied, and the routine returns, the control circuit 133 calculates the memorable number of articles on the basis of the remaining memory capacity of the memory 134 which has been decreased by acquisition of the tag IDs of the RFID tag circuit elements To for article at Step S77 and storage at Step S78, which will be described later.

At Step S25, the control circuit 133 outputs a control signal to the display portion 121 and displays the memorable number of articles calculated at Step S20 on the display portion 121 (See the display area 400A in FIG. 8A). In the second execution and after, contents are updated and displayed (See the display area 404A, for example, in FIG. 7E). Then, the routine goes to Step S30.

At Step S30, on the basis of the article number list acquired at Step S10, room determination processing for determining targets for arrangement display on the display portion 121 among the rooms R included in the list as the inventory-manageable rooms is carried out. The step S30 functions as a determining portion. For details, see FIG. 9, which will be described later.

At Step S40, the control circuit 133 arranges the work data every room of the plurality of rooms R determined at Step S30 as the inventory-manageable rooms in a descending order of the number of stored articles. The step S40 functions as a display processing portion. After that, the routine goes to Step S45.

At Step S45, the control circuit 133 outputs a control signal to the display portion 121 and displays the work data every room of the rooms R arranged in descending order of the number of stored articles at Step S40 on the display portion 121 (See the display area 402A in FIG. 7C and the display area 405C in FIG. 8E). The work data every room includes room name, the number of stored articles, and the number of ID acquired articles. After that, the routine goes to Step S50.

At Step S50, it is determined if the flag is zero or not. If the flag is zero, a determination is satisfied, and the routine goes to Step S55.

At Step S55, the control circuit 133 determines if the single room R to start the inventory work among the work data every room of the rooms R displayed on the display portion 121 at Step S45 has been selected and operated by the operator M through the operation portion 122. This determination may be made such that display prompting selection by the operator M such as "Select a room to start inventory" is made on the display portion 121, for example, and a determination is made on the basis of a signal input accordingly by the operator M using the operation portion 122. If the single room R to start the inventory work has been selected, the determination is satisfied, and the routine goes to Step S60.

At Step S60, the control circuit 133 has the work data every room of the room R selected at Step S55 displayed on the display portion 121 (See the display area 403A in FIG. 7D). After that, the routine goes to Step S65.

At Step S65, the control circuit 133 determines if a start operation of the inventory work has been carried out by the operator M through the operation portion 122. This determination may be made such that display prompting an operation by the operator M such as "Inventory work is to be started in the room R?" is made on the display portion 121, for example, and a determination is made on the basis of a signal input accordingly by the operator M using the operation portion 122. If the start operation of the inventory work is not carried out, the determination is not satisfied, and the routine returns to Step S55, where a similar procedure is repeated. On the other hand, if the start operation of the inventory work is started by the operator M, the determination is satisfied, and the routine goes to Step S70.

At Step S70, the control circuit 133 sets the flag to one indicating start status of the inventory work, and the routine goes to Step S75.

In the determination at the pervious Step S50, if the flag is one, the determination is not satisfied, and the routine goes directly to Step S75.

At Step S75, the control circuit 133 executes an inventory processing of the article B stored in the storage shelf S in the target room R (for details, see FIG. 10, which will be described alter). After that, the routine goes to Step S80.

At Step S80, the control circuit 133 determines if an end operation of the inventory work has been carried out by the operator M through the operation portion 122. This determination may be made such that display prompting an operation by the operator M such as "Inventory work is to be finished?" is made on the display portion 121, for example, and a determination is made on the basis of a signal input accordingly by the operator M using the operation portion 122. If the end operation of the inventory work is not carried out, the determination is not satisfied, and the routine returns to Step S20, where a similar procedure is repeated. On the other hand, if the end operation of the inventory work is carried out by the operator M, the determination is satisfied, and the routine goes to Step S85.

At Step S85, the control circuit 133 determines if the reader 100 has been attached to the cradle 200 or not. The routine stands by in a loop till the reader is attached to the cradle 200, and if the reader 100 is attached to the cradle 200, the determination is satisfied, and the routine goes to Step S90.

At Step S90, the control circuit 133 makes an access to the database 300 of the server 301 connected through the cradle 200 and the network NW and outputs the tag ID of the RFID tag circuit element To for article stored in the memory 134 in the inventory processing at Step S75 (for details, see Step S78, which will be described later) to the database 300. The step S90 functions as a tag identification information output portion. The output of the tag ID of the RFID tag circuit element To for article may be made by manual input by the operator M using the operation portion 122. Then, this flow is finished.

FIG. 9 shows a flowchart illustrating a detailed procedure of Step S30.

In FIG. 9, first, at Step S32, the control circuit 133 compares, with regard to the single room R according to a predetermined order among the rooms R included in the article number list acquired at Step S10, a corresponding number of stored articles with the memorable number of articles calculated at Step S20 and determines if the stored number of articles of the room R is not more than the memorable number of articles or not, in other words, is inventory-manageable room or not. In the case of (number of stored articles)>(memorable number of articles), the determination is not satisfied, and the routine goes to Step S35, where the room R is set to be excluded from the room R to be arranged at Step S40, which will be described later, and the routine goes to Step S37, which will be described later.

On the other hand, in the case of (number of stored articles) ≦ (memorable number of articles), the determination is satisfied, and the routine goes to Step S36, where the room R is set as the room R to be arranged at Step S40, which will be described later, and the routine goes to Step S37.

At Step S37, it is determined if a setting at Step S35 or Step S36 has been finished or not for all the rooms R included in the article number list acquired at Step S10. If setting has not been finished for all of them, the determination at Step S37 is not satisfied, and the routine returns to Step S32, where a similar procedure is repeated.

On the other hand, if the setting at Step S35 or Step S36 has been finished for all the rooms R, the determination at Step S37 is satisfied, and this routine is finished. As a result, only those with the number of stored articles not more than the memorable number of articles are determined from all the rooms R included in the article number list acquired at Step S10 and can be set as the inventory-manageable rooms.

As described above, instead of a method determining (Step S36) the inventory-manageable room by calculating the memorable number of articles by dividing the remaining memory capacity of the memory 134 by the length of information including the tag ID relating to a single article (Step S20) and by comparing the memorable number of articles with the number of stored articles of each room R, another method may be used. That is, to the contrary to the, it may be so configured the memory capacity required for the inventory processing of each room R is calculated by multiplying the number of stored articles in each room R by the length of information including the tag ID relating to a single article, a calculated required memory capacity is compared with the remaining memory capacity of the memory 134, and if the former is smaller, the room is determined as the inventory-manageable room. In this case, too, a similar advantage can be obtained.

FIG. 10 shows a flowchart illustrating a detailed procedure of Step S75.

First, at Step S76, the control circuit 133 outputs a control signal to a transmission portion 142 of the radio frequency circuit 131 and has an inventory command signal transmitted to the RFID tag circuit element To for article provided on the article B present in the storage shelf S of the single room R selected at Step S55 through the apparatus antenna 111.

At Step S77, the control circuit 133 determines if a response signal in response to the inventory command signal has been received from the RFID tag circuit element To for article or not, that is, if the tag ID has been acquired or not. This Step S77 comprises a tag identification information obtainment portion described in each claim. If the response signal has not been received, the determination is not satisfied, the routine returns to Step S76, and a similar procedure is repeated. On the other hand, if the response signal in response to the inventory command signal has been received, that is, the tag ID has been acquired, from the RFID tag circuit element To, the determination is satisfied, and the routine goes to Step S78.

At Step S78, the control circuit 133 stores the tag ID of the RFID tag circuit element To acquired at Step S77 in the memory 134. After that, the routine goes to Step S79.

At Step S79, the control circuit 133 calculates the number of articles B corresponding to the stored tag IDs by the method on the basis of a memory consumed amount of the tag ID of the RFID tag circuit element To stored in the memory 134 at Step S78. In other words, the control circuit 133 calculates a number of articles for which inventory has been taken. Then, a control signal is output to the display portion 121, the number of ID acquired articles included in the work data every room of the room R selected at Step S55 is updated and displayed on the display portion 121 (See the display area 404B in FIG. 7E). Then, this routine is finished.

The above flowchart does not limit the present invention to the procedure shown in the flow, but the procedures may be added/deleted or the order may be changed within a range not departing from a gist and technical idea of the invention.

As described above, in this embodiment, the plurality of articles B as inventory targets are stored in the storage shelves S in the plurality of rooms R1 to R6. Then, when the operator M takes an inventory, radio communication is conducted by the apparatus antenna 111 of the reader 100, the tag ID of the RFID tag circuit element To for article provided on each article B is acquired, and the acquired tag IDs are sequentially stored and accumulated in the memory 134. By means of such acquisition and storage of the tag IDs of the RFID tag circuit elements To for article, presence of the corresponding article B in the room R is confirmed, and the inventory of the article B is completed.

At this time, the name of each room R and the number of stored articles in each room R are associated with each other and stored in the database 300 of the server 301. Then, when inventory is to be taken, the name of each room R and a corresponding number of stored articles are acquired from the database 300 of the server 301 (Step S10). On the other hand, on the basis of the remaining memory capacity of the memory 134, the memorable number of articles is calculated (Step S20). The memorable number of articles equal to the number of RFID tag circuit elements To for article capable of newly storage of the tag ID. Then, the number of stored articles is compared with the memorable number of articles, and only the room R with (number of stored articles)≦(memorable number of articles) are determined as the inventory-manageable rooms (Step S30). As a result, since the operator M takes inventory to each of the rooms R determined as the inventory-manageable rooms in response to the determination, nonconformity in the inventory work caused by lack of memory capacity of the memory 134 does not occur but a smooth inventory work by the operator M can be ensured, and convenience is improved.

Also, particularly in this embodiment, when the plurality of rooms R is determined as the inventory-manageable rooms, the names of the rooms R are arranged and displayed in a mode according to a predetermined priority order on the display portion 121. The order is a descending order of the number of stored articles in the example. As a result, the plurality of rooms R presented as capable of executing inventory work can be displayed in a form rearranged in the order reflecting needs of the operator M, ease to use, specific priority ranks, and convenience can be further improved. If the numbers of stored articles are arranged and displayed in a descending order, inventory work can be carried out without waste for the rooms R which can effectively use more memory capacity in the plurality of rooms R capable of executing inventory.

Also, particularly in this embodiment, on the basis of a comparison and determination result of the number of stored articles and the memorable number of articles, the names of the rooms R to become the inventory-manageable rooms are displayed on the display screen 402 of the display portion 121. As a result, the names of the rooms R capable of executing smooth inventory work without incurring lack of memory capacity of the memory 134 can be visually notified to the operator M so as to be reliably recognized so that the inventory target is selected from them and inventory is taken.

Also, particularly in this embodiment, the number of stored articles of the room R to be the inventory-manageable room is displayed together with the name of the corresponding room R on the display portion 121 (See the display area 403A of the display screen 403). As a result, the operator M can sensuously recognize the memory capacity of the memory 134 consumed when the inventory work is executed for each room R. Also, by comparing the numbers of the articles B of the plurality of rooms R, an order of the inventory work can be determined as appropriate according to that. As a result, convenience can be further improved. Similarly, the memorable number of articles of the memory 134 is also displayed on the display portion 121 (See the display areas 400A, 403A, 404A and 405A on the display screens 400, 403, 404 and 405). As a result, how many tag IDs of several RFID tag circuit elements To for article are memorable can be visually notified to the operator M, by which for about how many articles B the inventory work can be executed can be recognized by the operator assuredly.

Also, particularly in this embodiment, the inventory work is started for a specific room R, and according to a decrease of the remaining memory capacity of the memory 134, the memorable number of articles is re-calculated (See Step S20 the second time and after executed after returning from Step S80) even in a middle of the inventory work. The memorable number of articles equal to a number of RFID tag circuit elements To for article capable of newly storing the tag ID. As a result, after the inventory work has been started, in a form changed in accordance with the decrease of the remaining memory capacity of the memory 134, the inventory-manageable room (See Step S30 executed second time and after) can be determined and the memorable number of articles can be displayed (See Step S25 executed second time and after) by the display portion 121. As a result, when the inventory work being executed at that time is finished, a name of the room R capable of inventory work, the memorable number of articles capable of executing newly storing can be displayed to the operator M subsequently, and a subsequent inventory work can be started rapidly and easily.

The present invention is not limited to the embodiment but capable of various variations within a range not departing from the gist and technical idea thereof. Variations will be described below in order.

(1) Variation of Arrangement Order

In the embodiment, as the priority order to arrange and display the rooms R determined as the inventory-manageable rooms, they are arranged and displayed in a descending order of the number of stored articles, but arrangement and display may be made in the priority order other than the. Variations will be described below in order.

(i) When Rearranged and Displayed in a Chronological Order of Previous Inventory Execution Time and Date:

That is, the plurality of rooms R determined as the inventory-manageable rooms may be arranged and displayed in the chronological order of previous inventory execution time and date.

In this variation, to the data items of the article number list shown in FIG. 6 of the embodiment, a corresponding execution time and date of a previous inventory is added. FIG. 11 conceptually shows data contents of the article number list stored in the database 300 of the server 301 in this variation. FIG. 11 is a diagram corresponding to the FIG. 6.

In FIG. 11, this article number list includes the names of the rooms R, a corresponding numbers of articles B (the same contents as in the FIG. 6 in this example), and an execution time and date of a previous inventory. In this example, the number of stored articles in the room R1 (name "roomA") is 300 [pieces], and an execution time and date of a previous inventory is 13:00, Jul. 21, 2008. Similarly, an execution time and date of a previous inventory of the room R2 (name "roomB") is 13:00, Jul. 21, 2008, an execution time and date of a previous inventory of the room R3 (name "roomC") is 13:00, Jul. 23, 2008, an execution time and date of a previous inventory of the room R4 (name "roomD") is 13:00, Jul. 18, 2008, an execution time and date of a previous inventory of the room R5 (name "roomE") is 13:00, Jul. 19, 2008, and an execution time and date of a previous inventory of the room R6 (name "roomF") is 13:00, Jul. 20, 2008.

FIG. 13 show an example of display screens 410 to 415 displayed on the display portion 121 of the reader 100 in this variation. FIG. 13 are diagrams corresponding to FIG. 7 of the embodiment, and the displays equivalent to those in FIG. 7 are given the same reference numeral and a description will be omitted.

Similarly to FIG. 7, on the basis of an appropriate operation by the operator before the inventory work is started, the control circuit 133 calculates the memorable number of articles on the basis of the remaining memory capacity of the memory 134 and displays it on the display screen 410 in FIG.

12A in the display portion 121. Since this display screen 410 is equivalent to the display screen 400 in the FIG. 7A, a description will be omitted.

After that, similarly to the embodiment, the control circuit 133 acquires the number of stored articles of each room R as the inventory target from the database 300, compares the number of stored articles with the memorable number of articles and determines the inventory-manageable room. FIG. 12B shows an example of the number of stored articles of each of the rooms R1 to R6 (roomA to roomF) determined as the inventory-manageable rooms and equivalent to the FIG. 7B.

Then, when the number of stored articles of each room R determined as the inventory-manageable room is acquired as in FIG. 12B, the control circuit 133 arranges the work data every room including a name, the number of stored articles, and the number of ID acquired articles of each of the inventory-manageable rooms R in a chronological order of a corresponding previous inventory execution time and date. FIG. 12C is a diagram illustrating the display screen 412 displayed on the display portion 121 at this time.

In FIG. 12C, on the display screen 412, the memorable number of articles ("remaining memory amount 600") and work data every room of the room R determined as the inventory-manageable room are displayed. The work data every room includes name, the number of stored articles, the number of ID acquired articles. The name, the number of stored articles, and the number of ID acquired articles of each room R are, as described above, arranged from an upper stage to a lower stage in the chronological order of a previous inventory execution time and date, that is, in an order of the room R4, the room R5, the room R6, the room R1, the room R2, and the room R3 in this example (See display area 412A).

If the operator M selects the single room R to start the inventory work in a state in which the display screen 412 is displayed, the display moves to the display screen 413 shown in FIG. 12D. Since the display screen 413 in FIG. 12D has display contents equivalent to those in FIG. 7D except that an arrangement of each of the work data every room is different from that in FIG. 7D, detailed description will be omitted. As for procedures and the display screens 414, 415 in FIGS. 13E and 13F, too, only an arrangement order of the work data every room of the plurality of rooms R determined as the inventory-manageable rooms is different and procedures and the display screens are substantially equal to the procedures and display screens 404, 405 in the FIG. 7E and FIG. 7F, and a description will be omitted.

FIG. 13 shows a control procedure executed by the control circuit 133 of the reader 100 in this variation. FIG. 13 is a diagram corresponding to the FIG. 8, and same reference numerals are given to the procedures similar to those in FIG. 8, and a description will be omitted as appropriate.

In FIG. 13, instead of Step S5, Step S10, Step S40, and Step S45 in the FIG. 8, Step S5A, Step S10A, Step S40A, and Step S45A are provided. That is, at Step S5A, the control circuit 133 determines if an operation to acquire the article number list relating to each room R from the database 300 of the server 301 or not. The list includes, as described above, the room name, the number of stored articles, and the execution time and date of a previous inventory are included in this variation. The routine stands by in a loop till the operation to acquire the article number list is carried out. If the operation to acquire the article number list is carried out, the determination is satisfied the routine goes to Step S10A, and the article number list including the room name, the number of stored articles, the execution time and date of a previous inventory is acquired from the database 300. The step S10A functions as an article number information obtainment portion.

Subsequent procedures at Step S15 to Step S30 are the same as those in the FIG. 8. That is, the number of stored articles of each room R included in the article number list acquired at Step S10A and the memorable number of articles calculated at Step S20 are compared with each other at Step S30 so as to determine the inventory-manageable room. After that, the routine goes to Step S40A.

At Step S40A, the control circuit 133 arranges the work data every room of the plurality of rooms R determined as the inventory-manageable rooms at Step S30 in a chronological order of a corresponding previous inventory execution time and date. The step S40A functions as a display processing portion. After that, the routine goes to Step S45A.

At Step S45A, the control circuit 133 outputs a control signal to the display portion 121 and has the work data every room of each room R arranged in a chronological order of a corresponding previous inventory execution time and date at Step S40A displayed on the display portion 121 (See the display area 412A in FIG. 12C). The work data every room includes the room name, the number of stored articles, and the number of ID acquired articles. After that, the routine goes to Step S50.

Since subsequent procedures are the same as those in the FIG. 8, a description will be omitted.

The above flowchart does not limit the present invention to the procedure shown in the flow, but procedures may be added/deleted or the order may be changed within a range not departing from a gist and technical idea of the invention.

In this variation, too, similarly to the embodiment, if the plurality of rooms R are determined as inventory-manageable room, the names of the applicable rooms R are arranged and displayed in the mode according to the predetermined priority order, that is, in the chronological order of a previous inventory execution time and date in the example, on the display portion 121. As a result, the plurality of rooms R presented as inventory-manageable rooms can be displayed in the form rearranged in the order reflecting the needs of the operator M, ease to use, and convenience can be further improved. By arranging and displaying on the display portion 121 in the chronological order of a previous inventory execution time and date as in this example, the inventory can be reliably taken for the rooms R in which a longer period of time has elapsed since a previous inventory in the plurality of inventory-manageable rooms R.

(ii) When Rearranged and Displayed in a Descending Order of an Index of Priority:

That is, the plurality of rooms R determined as inventory-manageable rooms may be arranged and displayed in a descending order of the index of priority given in advance, such as priority ranks "high", "medium", "low".

In this variation, corresponding indexes of priority are added to the data items of the article number list shown in FIG. 6 of the embodiment. FIG. 14 conceptually shows data contents of the article number list stored in the database 300 of the server 301 in this variation. FIG. 14 corresponds to the FIGS. 7 and 12.

In FIG. 14, the article number list includes the names of the rooms R, a corresponding numbers of articles B (the same contents as those in FIGS. 7 and 12 in this example), and the indexes of priority. Namely, there are 6 ranks, namely, "1", "2", "3", "4", "5", and "6" in this example, and the smaller the value is, the higher the priority is. In this example, the number of stored articles of the room R1 (name "roomA") is 300 [pieces] and the index of priority is "2", and similarly, the index of priority of the room R2 (name "roomB") is "5", the index of priority of the room R3 (name "roomC") is "1", the index of priority of the room R4 (name "roomD") is "4", the index of priority of the room R5 (name "roomE") is "3", and the index of priority of the room R6 (name "roomF") is "6".

FIG. 16 show an example of display screens 420 to 425 displayed on the display portion 121 of the reader 100 in this variation. FIG. 16 are diagrams corresponding to the FIGS. 8 and 13, and the same reference numerals are given to the displays similar to those in FIG. 7, and a description will be omitted as appropriate.

First, similarly to FIG. 7, on the basis of an appropriate operation by the operator, the control circuit 133 calculates the memorable number of articles and displays the display screen 420 in FIG. 15A. After that, the number of stored articles of each room R as an inventory target is acquired from the database 300, and the inventory-manageable room is determined. FIG. 15B shows an example of the numbers of stored articles of the rooms R1 to R6 (roomA to roomF) determined as the inventory-manageable rooms. The display screen 420 in FIG. 15A is the same as the display screen 400 in the FIG. 7A, and FIG. 15B is equivalent to FIG. 7B, and a description will be omitted, respectively.

When the numbers of stored articles of the rooms R determined as the inventory-manageable rooms as in FIG. 15B, the control circuit 133 arranges the names of the inventory-manageable rooms R, the work data every room including the numbers of stored articles, and the numbers of ID acquired articles in a descending order of a corresponding index of priority. FIG. 15C is a diagram illustrating the display screen 422 displayed on the display portion 121 at this time.

In FIG. 15C, on the display screen 422, the memorable numbers of articles ("remaining memory amount 600") and the work data every room of the rooms R determined as the inventory-manageable rooms are displayed. The work data every room includes names, numbers of stored articled, the numbers of ID acquired articles. The names of the rooms R, the numbers of stored articles, and the numbers of ID acquired articles are, as described above, arranged in a descending order of the index of priority from an upper stage to a lower stage, that is, in an order of the room R3, the room R1, the room R5, the room R3, the room R2, and the room R6 in this example (See display area 422A).

If the operator M selects the single room R to start the inventory work in a state in which the display screen 422 is displayed, the display moves to the display screen 423 shown in FIG. 16D. Since subsequent procedures in FIGS. 17D, 17E, 17F and display contents on the display screens 423, 424, 425 are substantially the same except that an arrangement of the work data every room is different from that in FIGS. 8D, 8E, 8F, a description will be omitted.

FIG. 16 shows a control procedure executed by the control circuit 133 of the reader 100 in this variation. FIG. 16 is a diagram corresponding to the FIGS. 9 and 14, and the same reference numerals are given to the procedures similar to those in FIG. 8, and a description will be omitted as appropriate.

In FIG. 16, instead of Step S5, Step S10, Step S40, and Step S45 in the FIG. 8, Step S5B, Step S10B, Step S40B, and Step S45B are provided. That is, at Step S5B, the control circuit 133 determines if an operation to acquire the article number list relating to each room R from the database 300 of the server 301 or not. The list includes, as described above, the room name, the number of stored articles, and the index of priority are included in this variation. The routine stands by in a loop till the operation to acquire the article number list is carried out. If the operation to acquire the article number list is carried out, the determination is satisfied the routine goes to Step S10B, and the article number list including the room name, the number of stored articles, the index of priority is acquired from the database 300. The step S10B functions as an article number information obtainment portion.

Subsequent procedures at Step S15 to Step S30 are the same as those in the FIG. 8. That is, the number of stored articles of each room R included in the article number list acquired at Step S10B and the memorable number of articles calculated at Step S20 are compared with each other at Step S30 so as to determine the inventory-manageable room. After that, the routine goes to Step S40B.

At Step S40B, the control circuit 133 arranges the work data every room of the plurality of rooms R determined as the inventory-manageable rooms at Step S30 in a descending order of a corresponding index of priority. The step S40B functions as a display processing portion. After that, the routine goes to Step S45B.

At Step S45B, the control circuit 133 outputs a control signal to the display portion 121 and has the work data every room of each room R arranged in a descending order of the index of priority at Step S40B displayed on the display portion 121 (See the display area 422A in FIG. 15C). The work data every room includes the room name, the number of stored articles, and the number of ID acquired articles. After that, the routine goes to Step S50.

Subsequent procedures are the same as those in the FIG. 8, a description will be omitted.

The above flowchart does not limit the present invention to the procedure shown in the flow, but procedures may be added/deleted or the order may be changed within a range not departing from a gist and technical idea of the invention.

In this variation, too, similarly to the embodiment, if the plurality of rooms R is determined as inventory-manageable rooms, the names of the applicable rooms R are arranged and displayed in the mode according to the predetermined priority order, that is, in a descending order of the index of priority given in advance in the example, on the display portion 121. As a result, the plurality of rooms R presented as inventory-manageable rooms can be displayed in the form rearranged in the order reflecting the needs of the operator M, ease to use, and convenience can be further improved. By arranging and displaying on the display portion 121 in a descending order of the index of priority as in this example, the operator M can take inventory efficiently for the rooms R with a higher priority set in advance in the plurality of inventory-manageable rooms R.

(iii) When Rearranged and Displayed in an Order from a Room with a Shorter Distance from a Reference Position:

That is, the plurality of rooms R determined as the inventory-manageable rooms may be arranged and displayed in the order of shorter distance from the room R from a reference position. The reference position is a room R in which the inventory work is currently being done, for example.

In this variation, distance comparison data from each corresponding room R is added to the data items of the article number list shown in FIG. 6 in the embodiment. FIG. 17 conceptually shows data contents of the article number list stored in the database 300 of the server 301 in this variation. FIG. 17 is a diagram corresponding to the FIGS. 7, 12, and 15.

In FIG. 17, the article number list includes the names of the rooms R, numbers of corresponding articles B (the same contents as those in FIGS. 7 and 12 in this example) and distance comparison data. In this example, the distance comparison data of the room R1 is arranged in the order of shorter distance from the room R1 such as the room R2, the room R4, the room R5, the room R3, and the room R6. That is, it is recorded that a room closest from the room R1 is the room R2, the second closest room is the room R4, and thereafter in the order of the room R5, the room R3, the room R6. Similarly, in the distance comparison data of the room R2, the data is arranged in an order of the room R1, the room R3, the room R5, the room R4, and the room R6, the distance comparison data of the room R3 is arranged in an order of the room R2, the room R6, the room R5, the room R1, and the room R4, the distance comparison data of the room R4 is arranged in an order of the room R1, the room R5, the room R2, the room R6, and the room R3, the distance comparison data of the room R5 is arranged in an order of the room R2, the room R4, the room R6, the room R1, and the room R3, and the distance comparison data of the room R6 is arranged in an order of the room R3, the room R5, the room R2, the room R4, and the room R1.

FIG. 19 show an example of display screens 430 to 434 displayed on the display portion 121 of the reader 100 in this variation. FIG. 19 are diagrams corresponding to the FIGS. 8, 13 and 16, and the same reference numerals are given to the displays similar to those in FIG. 7, and a description will be omitted.

First, similarly to FIG. 7, on the basis of an appropriate operation by the operator, the control circuit 133 calculates the memorable number of articles and displays the display screen 430 in FIG. 18A. After that, the number of stored articles of each room R as an inventory target is acquired from the database 300, and the inventory-manageable room is determined. The display screen 430 in FIG. 18A is the same as the display screen 400 in the FIG. 7A, and a description will be omitted, respectively.

In this variation, unlike the case of the FIGS. 13B, 16B, the numbers of stored articles of the rooms R1 to R6 (roomA to roomF) determined as the inventory-manageable rooms are displayed as the display screen 431 on the display portion 121 as shown in FIG. 18B. Display contents are the same as those in FIG. 7B, and as described above, the number of ID acquired articles/the number of stored articles is shown on a display area 431A such that the room R1 (name "roomA") is "0/300" and similarly, the room R2 (name "roomB") is "0/100", the room R3 (name "roomC") is "0/250", the room R4 (name "roomD") is "0/500", the room R5 (name "roomE") is "0/450", and the room R6 (name "roomF") is "0/150".

If the operator M selects the single room R to start the inventory work through an appropriate operation of the operation portion 122 in a state in which the display screen 431 is displayed, the control circuit 133 arranges names of the inventory-manageable rooms R, a corresponding numbers of stored articles, and the numbers of ID acquired articles in the order of shorter distance positionally from the selected room R, and the display moves to the display screen 432 shown in FIG. 18C.

The display screen 432 in FIG. 18C shows an example of a case in which the room R5 is selected on the display screen 431 of FIG. 18B. As shown in the figure, as the result of this selection, on a display area 432B in a lower part of the memorable number of articles "remaining memory amount 600", the work data every room "roomE 0/450" corresponding to the selected room R5 is displayed. In other words, a display location is extracted from the display area 431A close to a lower part of the display portion 121 and moved to the display area 432B close to an upper part. Then, on a display area 432A on a lower part, the work data every room of the rooms R2, R4, R6, R1 and R3 except the work data every room corresponding to the selected room R5 is displayed in this order, that is, in an order of shorter distance from the selected room R5, such as "roomB 0/100", "roomD 0/500", "roomF 0/150", "roomA 0/300", and "roomC 0/250".

If the operator M starts the inventory work in the selected room R5 through an appropriate operation of the operation portion 122 in a state in which the display screen 432A is displayed, the display moves to the display screen 433 shown in FIG. 18D. Since procedures and the display screens 433, 434 in FIGS. 19D, 19E are different from the FIGS. 8E, 8F in an arrangement of the work data every room and display contents are substantially the same, a description will be omitted.

FIG. 19 shows a control procedure executed by the control circuit 133 of the reader 100 in this variation. FIG. 19 is a diagram corresponding to the FIGS. 9, 14 and 17, and the same reference numerals are given to displays similar to those in FIG. 8, and a description will be omitted as appropriate.

In FIG. 19, Step S40, Step S45 in the FIG. 8 are deleted, and instead of Step S5 and Step S10, Step S5C and Step S10C are provided. Also, Step S53 is newly provided between Step S50 and Step S55, and Step S72 and Step S74 are provided between Step S70 and Step S75.

That is, at Step S5C, the control circuit 133 determines if an operation to acquire an article list relating to each room R from the database 300 of the server 301 or not. The list includes, as described above, including the room name, the number of stored articles, and the distance comparison data from each room R in this variation. The routine stands by in a loop till the operation to acquire the article number list is carried out. If the operation to acquire the article number list is carried out, the determination is satisfied, the routine goes to Step S10C, and the article number list including the room name, the number of stored articles, and the distance comparison data is acquired. The step S10C functions as an article number information obtainment portion.

Subsequent procedures from Step S15 to Step S30 are the same as those in the FIG. 8. That is, the number of stored articles of each room R included in the article number list acquired at Step S10C and the memorable number of articles calculated at Step S20 are compared with each other at Step S30, and the inventory-manageable rooms are determined.

When Step S30 is finished, the routine goes to Step S50 similarly to FIG. 8, it is determined if the flag is zero or not, and if the flag is zero, the determination is satisfied, and the routine goes to newly provided Step S53.

At Step S53, the control circuit 133 outputs a control signal to the display portion 121 and has the work data every room of the plurality of rooms R applicable to the inventory-manageable rooms displayed on the display portion 121 on the basis of a result at Step S30 (See the display area 431A in FIG. 18C). After that, the routine goes to Step S55 similar to FIG. 8.

Since procedures Step S55 to Step S70 are the same as those in the FIG. 8, a description will be omitted. After the flag indicating a start status of the inventory work is set to one at Step S70, the routine goes to newly provided Step S72.

At Step S72, the control circuit 133 arranges the work data every room of the rooms R except a selected room R in the order of shorter distance from the selected room R on the basis of a processing result at Step S30 and the selection result of the room R by the operator M at Step S60. The step S72 functions as a display processing portion. Then, the routine goes to Step S74.

At Step S74, the control circuit 133 outputs a control signal to the display portion 121 and has the work data every room of each room R arranged in the order of shorter distance at Step S72 displayed on the display portion 121 (See the display area 432A in FIG. 18C). The work data includes the room name, the number of stored articles, and the number of ID acquired articles. After that, the routine goes to Step S75.

Since subsequent procedures are the same as those in the FIG. 8, a description will be omitted.

The above flowchart does not limit the present invention to the procedure shown in the flow, but procedures may be added/deleted or the order may be changed or within a range not departing from a gist and technical idea of the invention.

In this variation, too, similarly to the embodiment, if the plurality of rooms R is determined as inventory-manageable rooms, the names of the applicable rooms R are arranged and displayed in the mode according to the predetermined priority order, that is, in the order of shorter distance from a reference position in the example, on the display portion 121. As a result, the plurality of rooms R presented capable of executing the inventory work can be displayed in the form rearranged in the order reflecting the needs of the operator M, ease to use, and convenience can be further improved. By arranging and displaying on the display portion 121 in the order of shorter distance from the reference position as in this example, the operator can take inventory efficiently for the rooms R closer and with less labor burden for moving in the plurality of rooms R capable of executing the inventory work. Not only to the case of setting the room R during the inventory taking as above to a reference position but an appropriate position detecting device may be provided so that current position of the reader 100 or the operator M detected by that are simply set as the reference position.

(2) Others

In the, information input/output between the reader 100 and the database 300 is carried out in a state in which the reader 100 is attached to the cradle 200, but not limited to that. That is, as described above, an access to the server 301 may be made possible via a communication line such as wireless LAN also in a state removed from the cradle 200.

Other than those already described above, methods of the embodiments and each variation may be combined as appropriate for use.

Though not specifically exemplified, the present invention should be put into practice with various changes made in a range not departing from its gist.

What is claimed is:

1. An apparatus for communicating with a radio frequency identification (RFID) tag comprising:
    an apparatus antenna configured to practice radio communication with an RFID tag circuit element for article provided on an article as an inventory target, said RFID tag circuit element having an IC circuit part configured to store information and a tag antenna capable of information transmission and reception;
    a tag identification information obtainment portion configured to obtain tag identification information of said RFID tag circuit element for article via radio communication using said apparatus antenna;
    a storage device configured, when said tag identification information is obtained by said tag identification information obtainment portion, to store said tag identification information the tag identification information obtained;
    an article number information obtainment portion configured to obtain area identification information of each storage area of a plurality of storage areas storing said articles and a number of the articles corresponding to said area identification information in association with each other from a database;
    a calculating portion configured to calculate a number of said RFID tag circuit elements for article on the basis of a remaining memory capacity of said storage device, the tag identification information of the RFID tag circuit elements capable of newly stored; and
    a determining portion configured to compare said number of articles obtained by said article number information obtainment portion with said number of said RFID tag circuit elements for article calculated by said calculating portion and to determine said storage area with a corresponding number of said articles not more than the number of said RFID tag circuit elements for article as an inventory-manageable area.

2. The apparatus for according to claim 1, further comprising a display device configured to display, on the basis of the result that said storage area with a corresponding number of said articles not more than the number of said RFID tag circuit elements for article is determined by said determining portion as said inventory-manageable area, said area identification information of the storage area.

3. The apparatus according to claim 2, wherein:
    said display device displays said number of articles obtained by said article number information obtainment portion together with said area identification information corresponding to the number of articles; and also displays a number of said RFID tag circuit elements for article capable of newly storing said tag identification information, the number calculated by said calculating portion.

4. The apparatus according to claim 2, further comprising an operating device configured for an operator to select and operate a single of said storage area to start inventory work, when said determining portion determines a plurality of said storage areas as said inventory-manageable areas and said display device displays said area identification information of the determined plurality of storage areas, wherein,
    said tag identification information obtainment portion obtains tag identification information of said RFID tag circuit elements for article relating to said articles present in said single storage area selected by said operating device.

5. The apparatus according to claim 4, wherein:
    said storage device stores said tag identification information obtained by said tag identification information obtainment portion after the selection operation by said operating device; and
    said calculating portion calculates the number of said RFID tag circuit elements for article, the tag identification information of the RFID tag circuit elements capable of newly stored, on the basis of said remaining memory capacity of said storage device decreased by storing of said tag identification information of said RFID tag circuit element for article obtained by said tag identification information obtainment portion.

6. The apparatus according to claim 5, wherein:
    said determining portion makes said determination by comparing the number of said articles obtained by said article number information obtainment portion before the selection operation by said operating device with the number of said RFID tag circuit elements for article calculated by said calculating portion after tag identification information is obtained by said tag identification information obtainment portion; and
    said display device updates and displays at least one of said area identification information, the number of said articles, and the number of said RFID tag circuit elements for article, on the basis of the determination result of said determining portion.

7. The apparatus according to claim 2, further comprising a display processing portion configured, if said determining portion determines a plurality of storage areas as said inventory-manageable areas, to carry out predetermined processing to arrange and display said area identification information of the storage area in a mode according to a predetermined priority order in said display device.

8. The apparatus according to claim 7, wherein:
said display processing portion executes said processing so that said plurality of storage areas determined as said inventory-manageable areas be arranged and displayed in said display device in a descending order of a corresponding number of said articles.

9. The apparatus according to claim 7, wherein:
said display processing portion executes said processing so that said plurality of storage areas determined as said inventory-manageable areas be arranged and displayed in said display device in order of shorter distance from a reference position.

10. The apparatus according to claim 7, wherein:
said display processing portion executes said processing so that said plurality of storage areas determined as said inventory-manageable areas be arranged and displayed in said display device in a descending order of an index of priority given in advance.

11. The apparatus according to claim 7, wherein:
said display processing portion executes said processing so that said plurality of storage areas determined as said inventory-manageable areas be arranged and displayed in said display device in a chronological order of a previous inventory execution time and date.

12. An article management system comprising:
a managing device having a database storing area identification information of each of a plurality of storage areas storing articles as inventory targets and a number of said articles corresponding to the area identification information in association with each other; and
an apparatus for communicating with a radio frequency identification (RFID) tag configured to practice radio communication with an RFID tag circuit element for article provided on said article and having an IC circuit part storing information and a tag antenna capable of information transmission and reception, and capable of information transmission and reception with said managing device, wherein
said apparatus for communicating with an RFID tag includes:
an apparatus antenna configured to practice said radio communication;
a tag identification information obtainment portion configured to obtain tag identification information of said RFID tag circuit element for article via radio communication using said apparatus antenna;
a storage device configured, when said tag identification information is obtained by said tag identification information obtainment portion, to store said tag identification information the tag identification information obtained;
an article number information obtainment portion configured to obtain area identification information of each of said storage areas and a corresponding number of said articles in association with each other from said database;
a calculating portion configured to calculate the number of said RFID tag circuit elements for article on the basis of a remaining memory capacity of said storage device, the tag identification information of the RFID tag circuit elements capable of newly stored;
a determining portion configured to compare said number of articles obtained by said article number information obtainment portion with said number of said RFID tag circuit elements for article calculated by said calculating portion and to determine said storage area with a corresponding number of said articles not more than the number of said RFID tag circuit elements for article as an inventory-manageable area; and
a tag identification information output portion configured to output to said managing device said tag identification information relating to the plurality of said articles obtained by said tag identification information obtainment portion and stored in said storage device.

* * * * *